US012701094B2

(12) United States Patent
Wang et al.

(10) Patent No.: US 12,701,094 B2
(45) Date of Patent: Aug. 4, 2026

(54) MESSAGING PROCESSING METHOD, APPARATUS, AND ELECTRONIC DEVICE

(71) Applicant: Beijing Zitiao Network Technology Co., Ltd., Beijing (CN)

(72) Inventors: Lingyu Wang, Beijing (CN); Runqiong Wang, Beijing (CN); Junyi Yang, Beijing (CN); Jianfeng Liang, Beijing (CN); Min Zhang, Beijing (CN); Dong Zhao, Beijing (CN); Changxiong Song, Beijing (CN); Jinze Mao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 27 days.

(21) Appl. No.: 18/541,365

(22) Filed: Dec. 15, 2023

(65) Prior Publication Data

US 2024/0121205 A1     Apr. 11, 2024

(30) Foreign Application Priority Data

Dec. 22, 2022     (CN) .......................... 202211656132.0

(51) Int. Cl.
*G06F 15/16* (2006.01)
*G06F 3/0481* (2022.01)
(Continued)

(52) U.S. Cl.
CPC ............ *H04L 51/04* (2013.01); *G06F 3/0481* (2013.01); *G06F 3/04842* (2013.01);
(Continued)

(58) Field of Classification Search
CPC ..... H04L 51/04; H04L 51/216; G06F 40/166; G06F 3/0481; G06F 3/04842; G06F 2203/04803
(Continued)

(56) References Cited

U.S. PATENT DOCUMENTS

2007/0016643 A1* 1/2007 Boss ....................... H04L 51/04
                                                        709/206
2008/0046532 A1  2/2008 Caspi et al.
                 (Continued)

FOREIGN PATENT DOCUMENTS

CN     104284028 A     1/2015
CN     111711558 A     9/2020
                 (Continued)

OTHER PUBLICATIONS

Google. "Do more with Messages". pp. 1-2. Jun. 18, 2021. (Year: 2021).*

(Continued)

*Primary Examiner* — Imad Hussain
(74) *Attorney, Agent, or Firm* — Astute IP Law Group

(57) ABSTRACT

Disclosed are methods of message processing, apparatuses therefor, and an electronic device. An implementation of the disclosure includes: presenting, responsive to a user's preset trigger operation in a target conversation, a schedule set area and a scheduled send button in the target conversation; determining a message send time set by the user via the schedule set area; and retrieving, after the user triggers the scheduled send button, message content in a message input box of the target conversation as message content for a target scheduled message, and creating the target scheduled message according to the message send time. This implementation realizes direct creation of a scheduled message via a message input box of an instant messaging client, facilitates converting an edited instant message to a scheduled message, extends functions of the instant messaging client, and enhances user experience.

15 Claims, 21 Drawing Sheets

(51) Int. Cl.
  *G06F 3/04842*      (2022.01)
  *G06F 40/166*       (2020.01)
  *H04L 51/04*        (2022.01)
  *H04L 51/216*       (2022.01)

(52) U.S. Cl.
  CPC .......... *G06F 40/166* (2020.01); *H04L 51/216*
        (2022.05); *G06F 2203/04803* (2013.01)

(58) Field of Classification Search
  USPC ........................................................ 709/206
  See application file for complete search history.

(56)                   References Cited

U.S. PATENT DOCUMENTS

| | | | | |
|---|---|---|---|---|
| 2014/0074952 | A1* | 3/2014 | White | G06F 16/3344 |
| | | | | 709/206 |
| 2020/0099636 | A1* | 3/2020 | Arquero | H04L 51/04 |
| 2023/0370405 | A1* | 11/2023 | Kim | H04L 51/226 |
| 2024/0121204 | A1* | 4/2024 | Zhang | H04L 51/046 |

FOREIGN PATENT DOCUMENTS

| | | |
|---|---|---|
| CN | 112764607 A | 5/2021 |
| CN | 112825048 A | 5/2021 |

OTHER PUBLICATIONS

Cipriani. "Google Messages just gave us the Android texting feature we've wanted forever". pp. 1-4. Mar. 13, 2021.(Year: 2021).*
Thompson. "How to schedule a Microsoft Teams chat message". pp. 1-4. Sep. 9, 2022. (Year: 2022).*
Nield. "How to Schedule Emails and Texts to Send Anytime You Want". Wired. pp. 1-13. Apr. 18, 2021. (Year: 2021).*
Slack. "Using Slack". pp. 1-3. Jan. 27, 2023. (Year: 2023).*
Simpletivity. "How to Schedule Text Messages to Send Later on Android". https://www.youtube.com/shorts/DmLroIDXxRM Aug. 19, 2021. (Year: 2021).*
"Get chatMessage in a channel or chat". Oct. 31, 2022 (Year: 2022).*
"Microsoft Teams Adds Support for Scheduling of Chat Messages". Dec. 21, 2022 (Year: 2022).*
Feishu Help Center. "Schedule messages to be sent later". 2024. pp. 1-7. (Year: 2024).*
Office Action for Chinese Patent Application No. 202211656132.0, mailed on Mar. 28, 2025, 18 pages.

\* cited by examiner

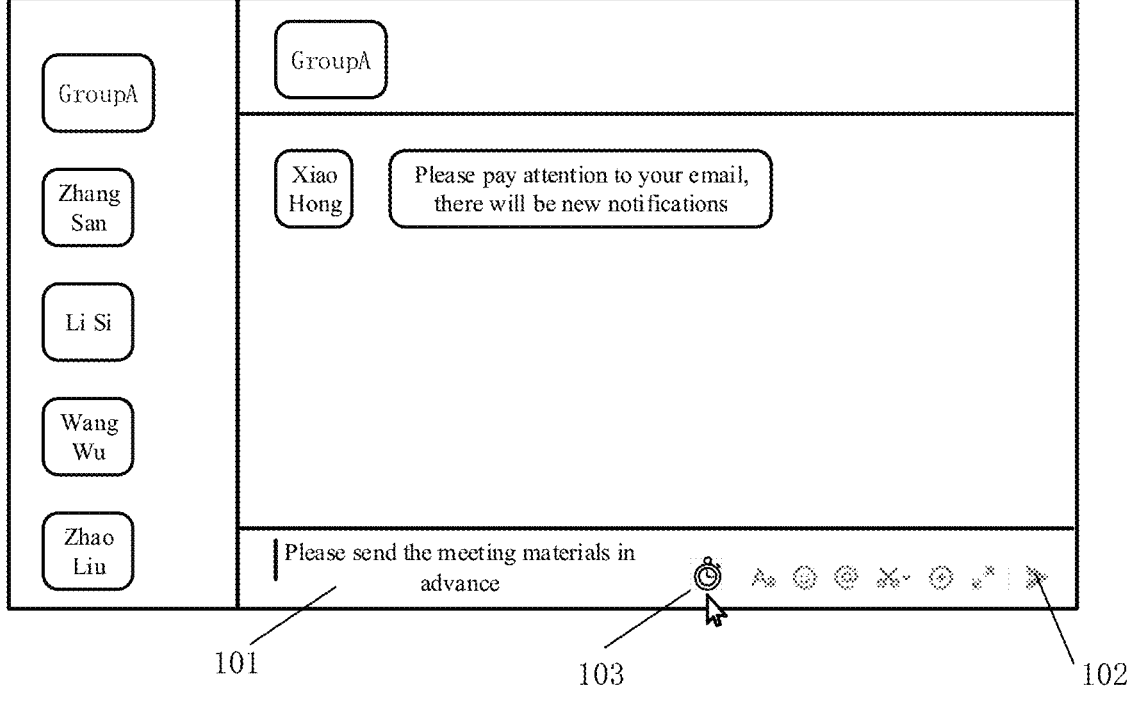
FIG. 1a1

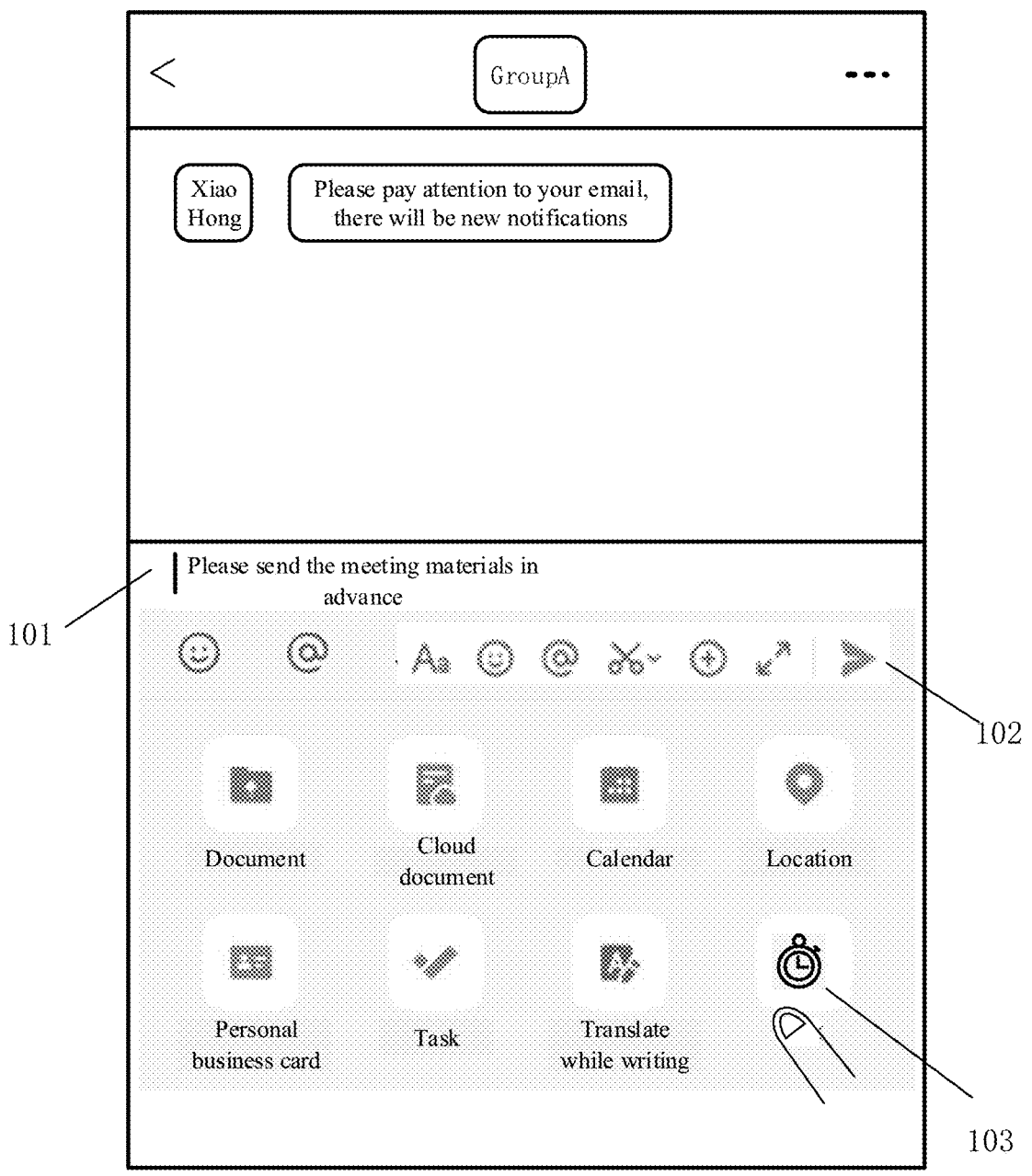
FIG. 1a2

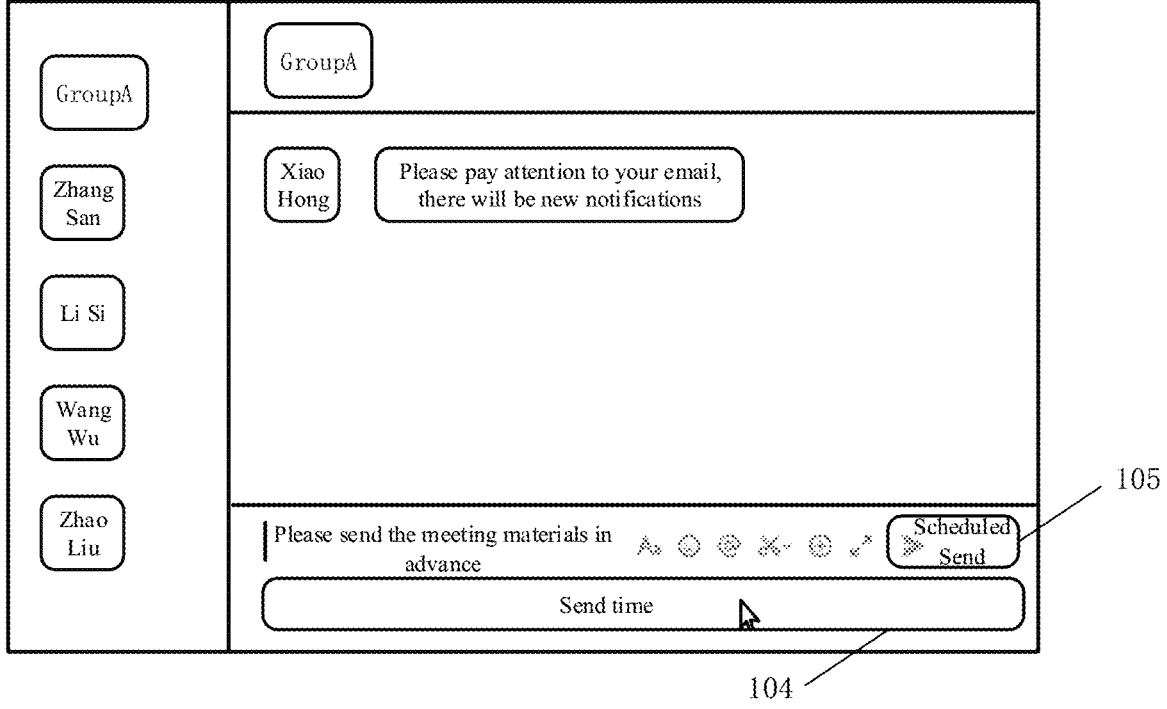
FIG. 1b1

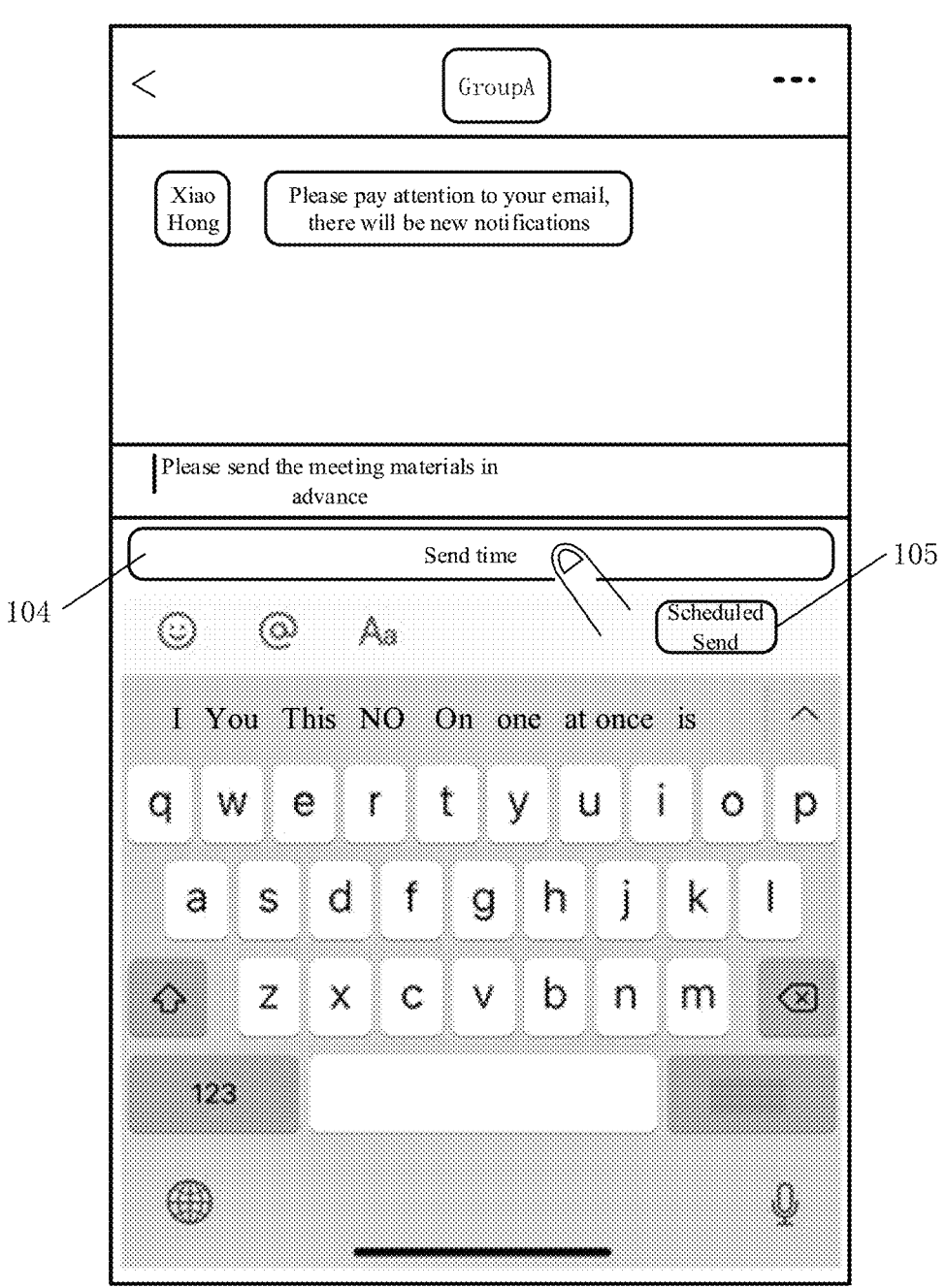
FIG. 1b2

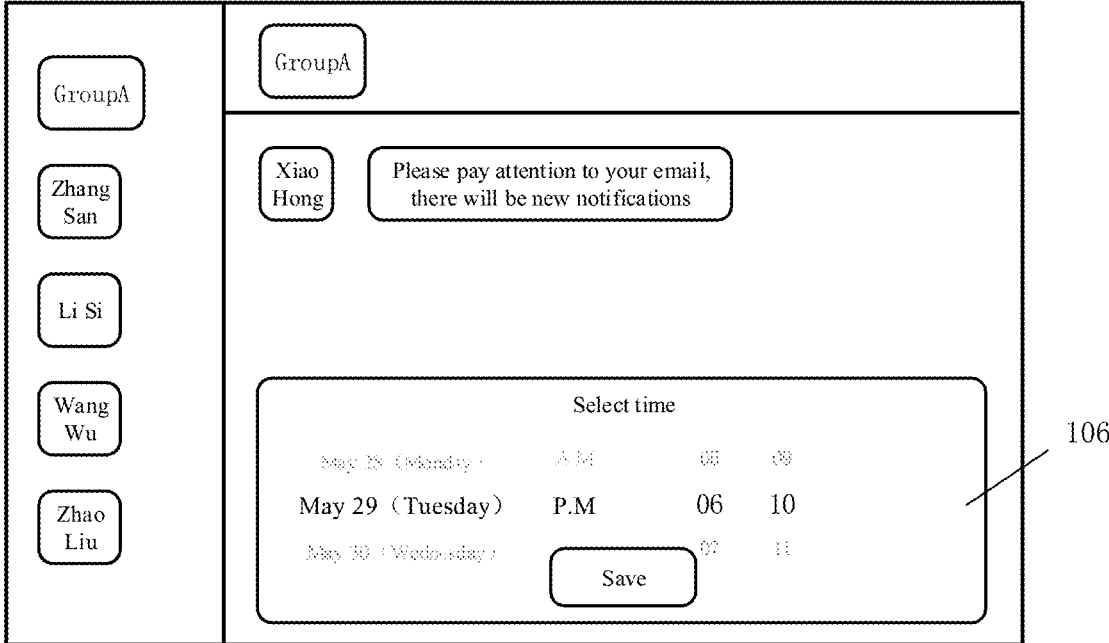
FIG. 1c1

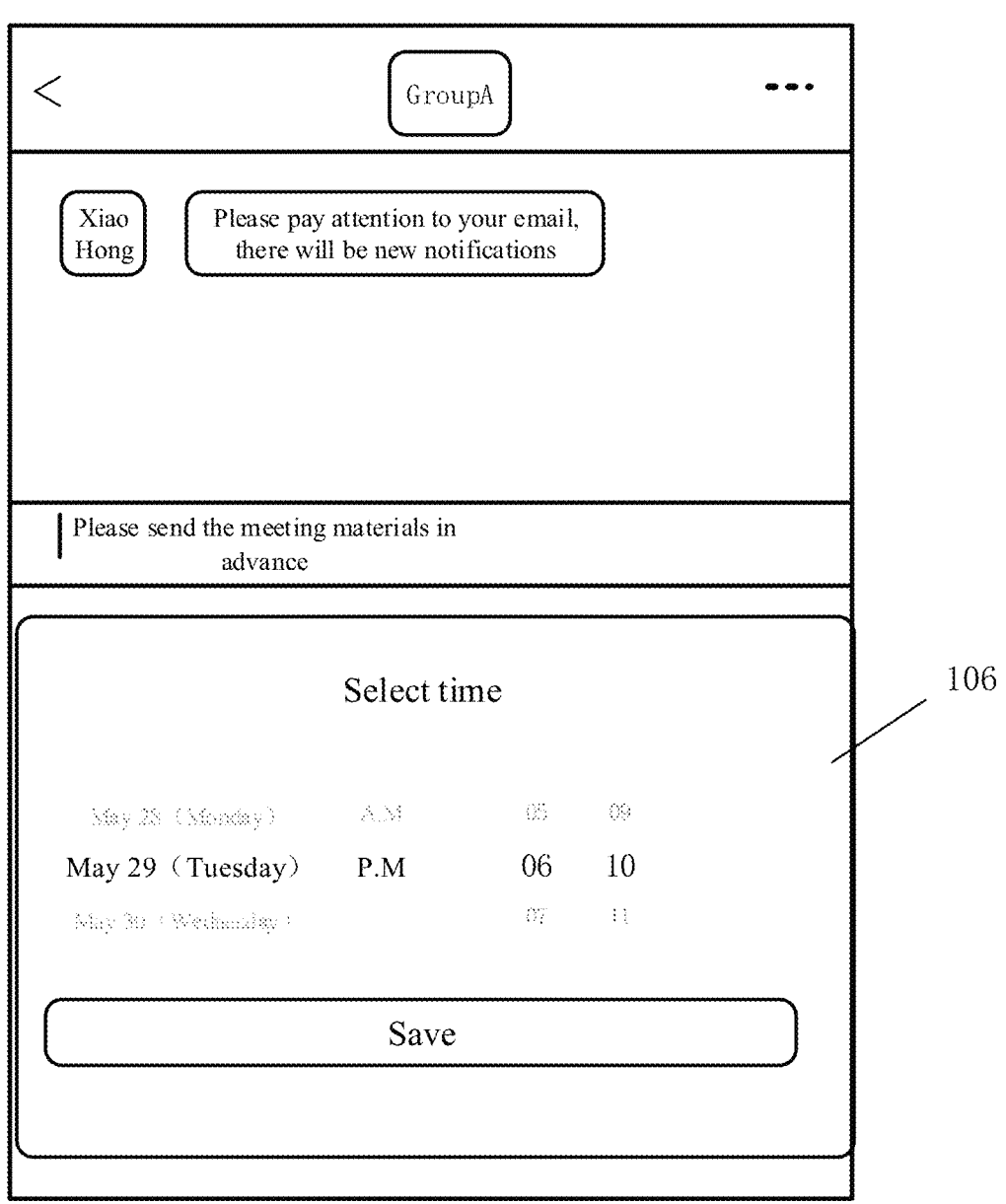
FIG. 1c2

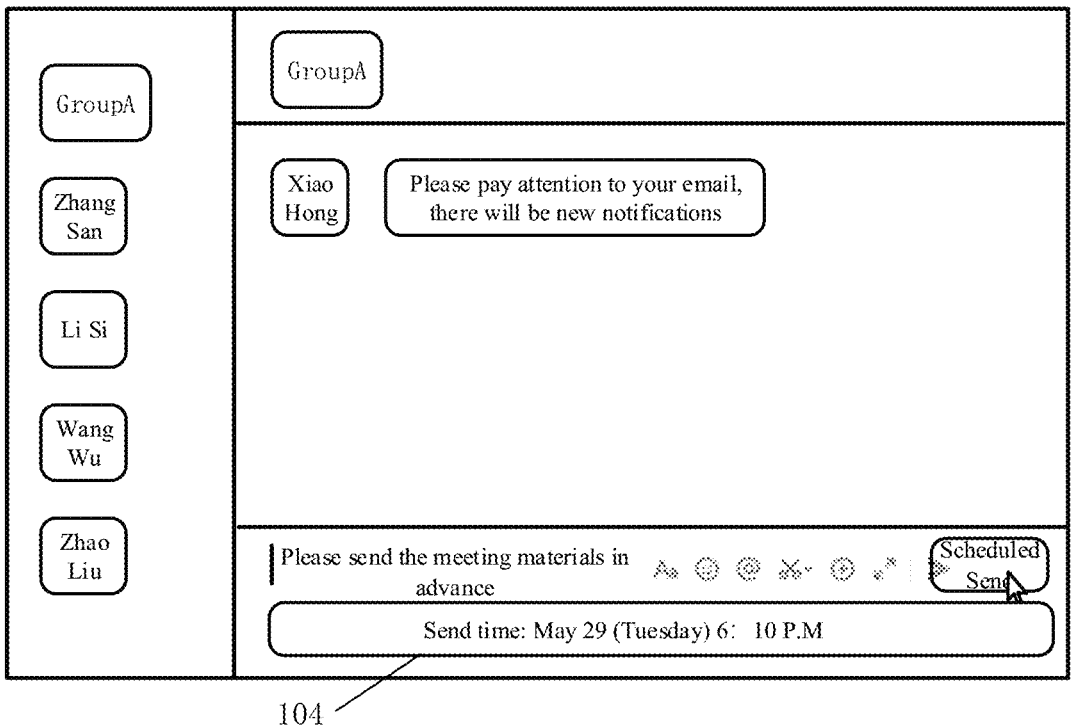
104
FIG. 1d1

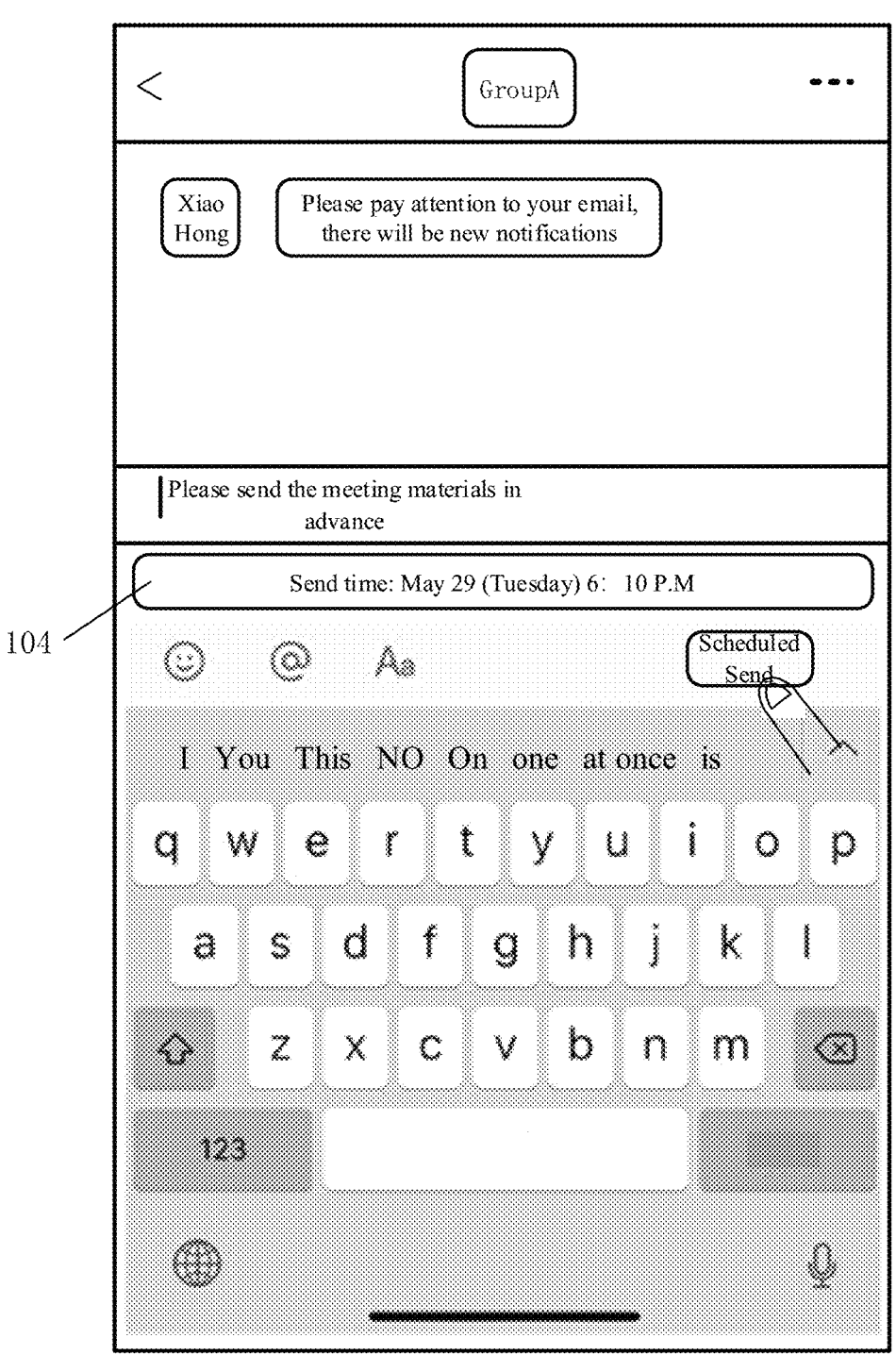
FIG. 1d2

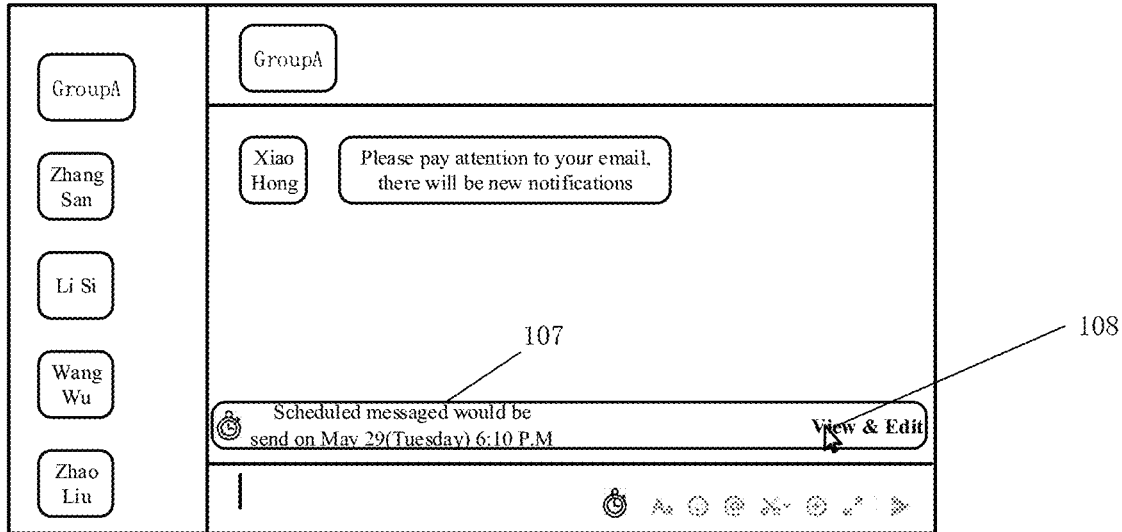
FIG. 1e1

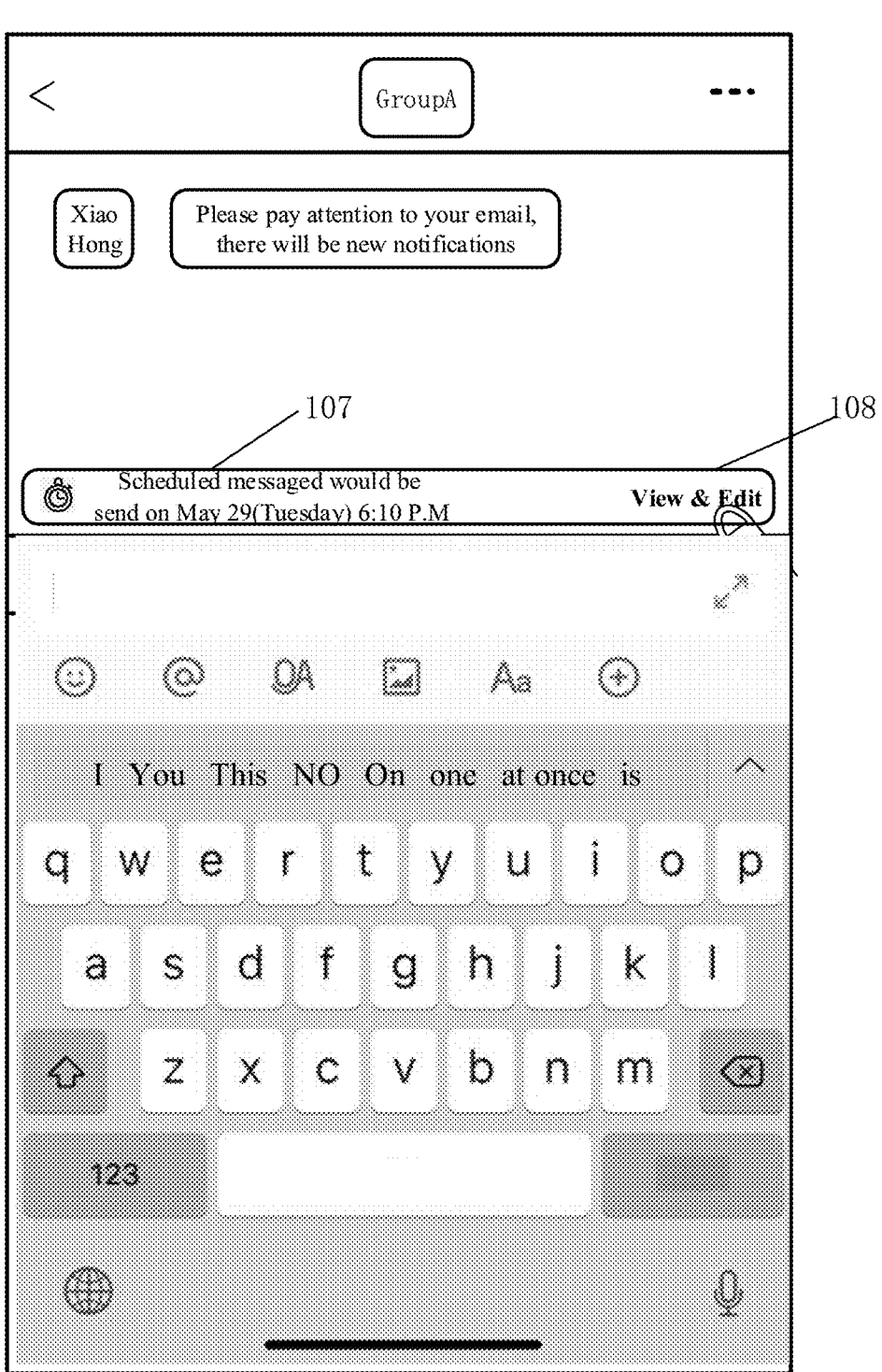
FIG. 1e2

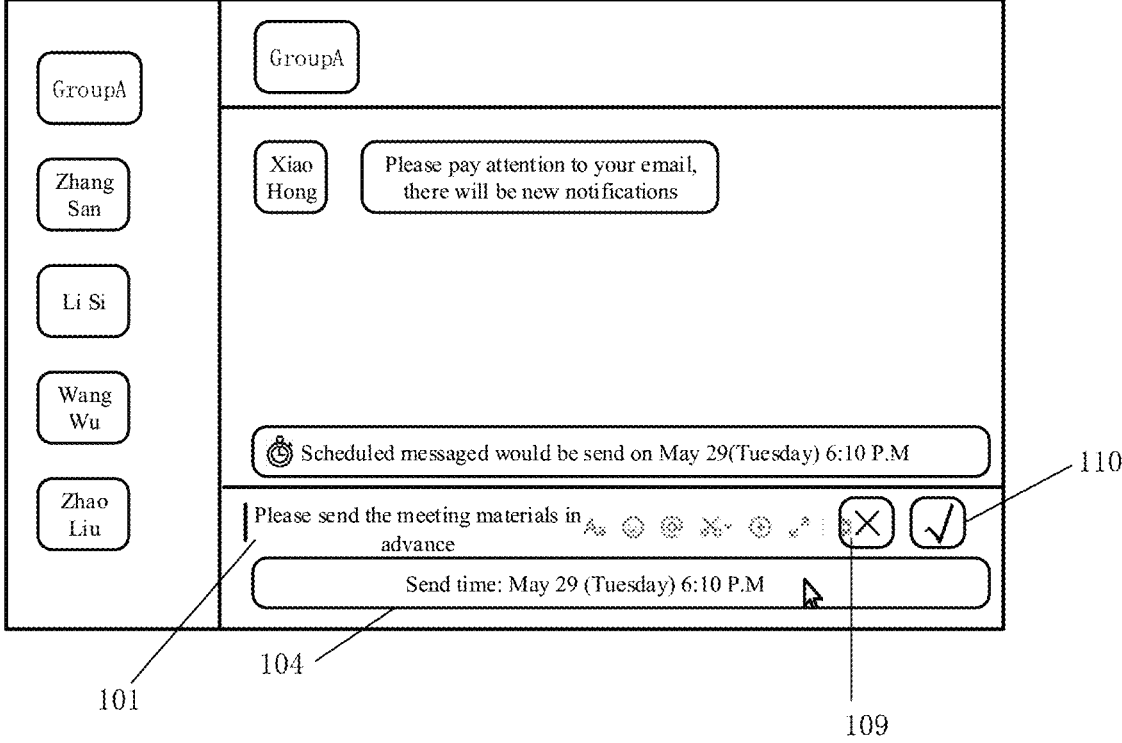
FIG. 1f1

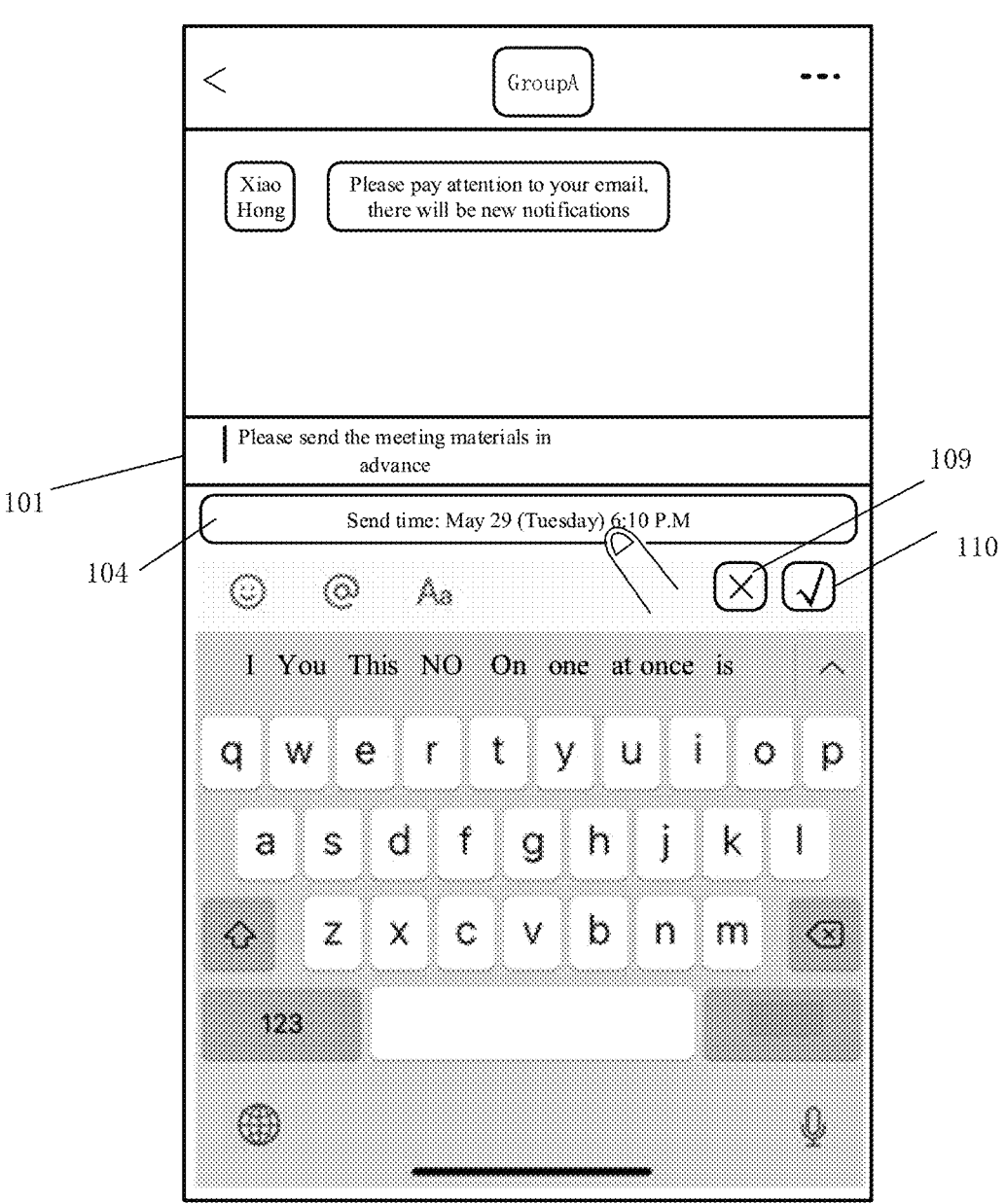
FIG. 1f2

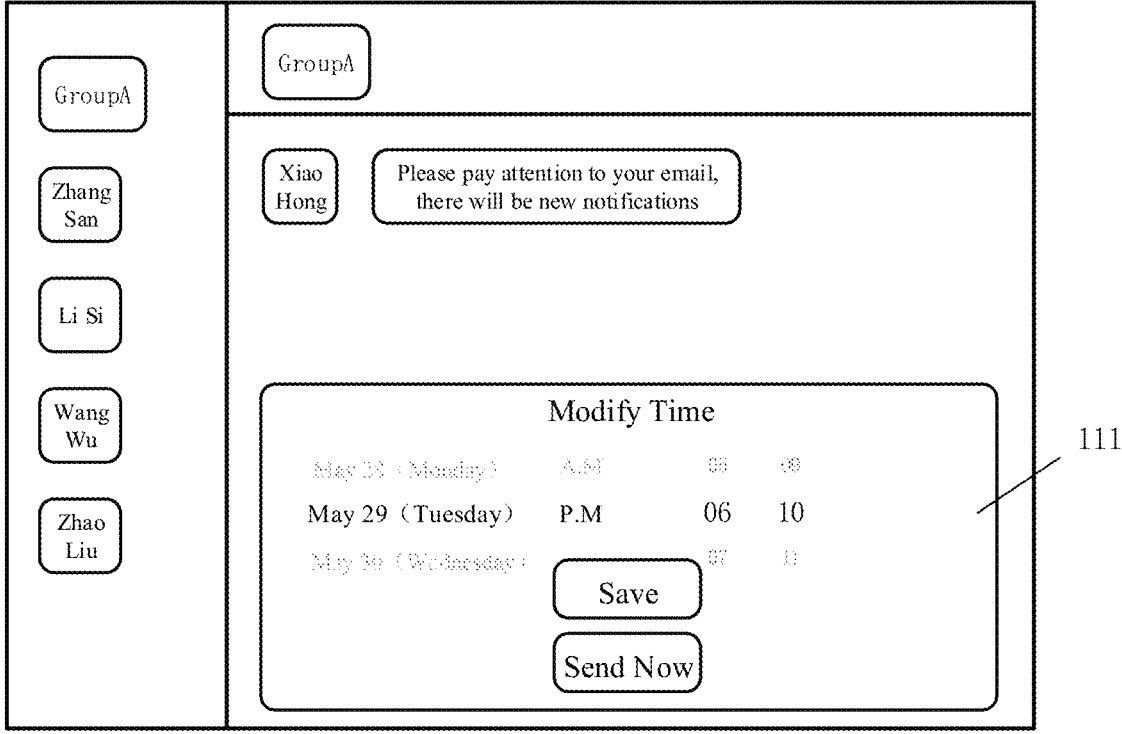
FIG. 1g1

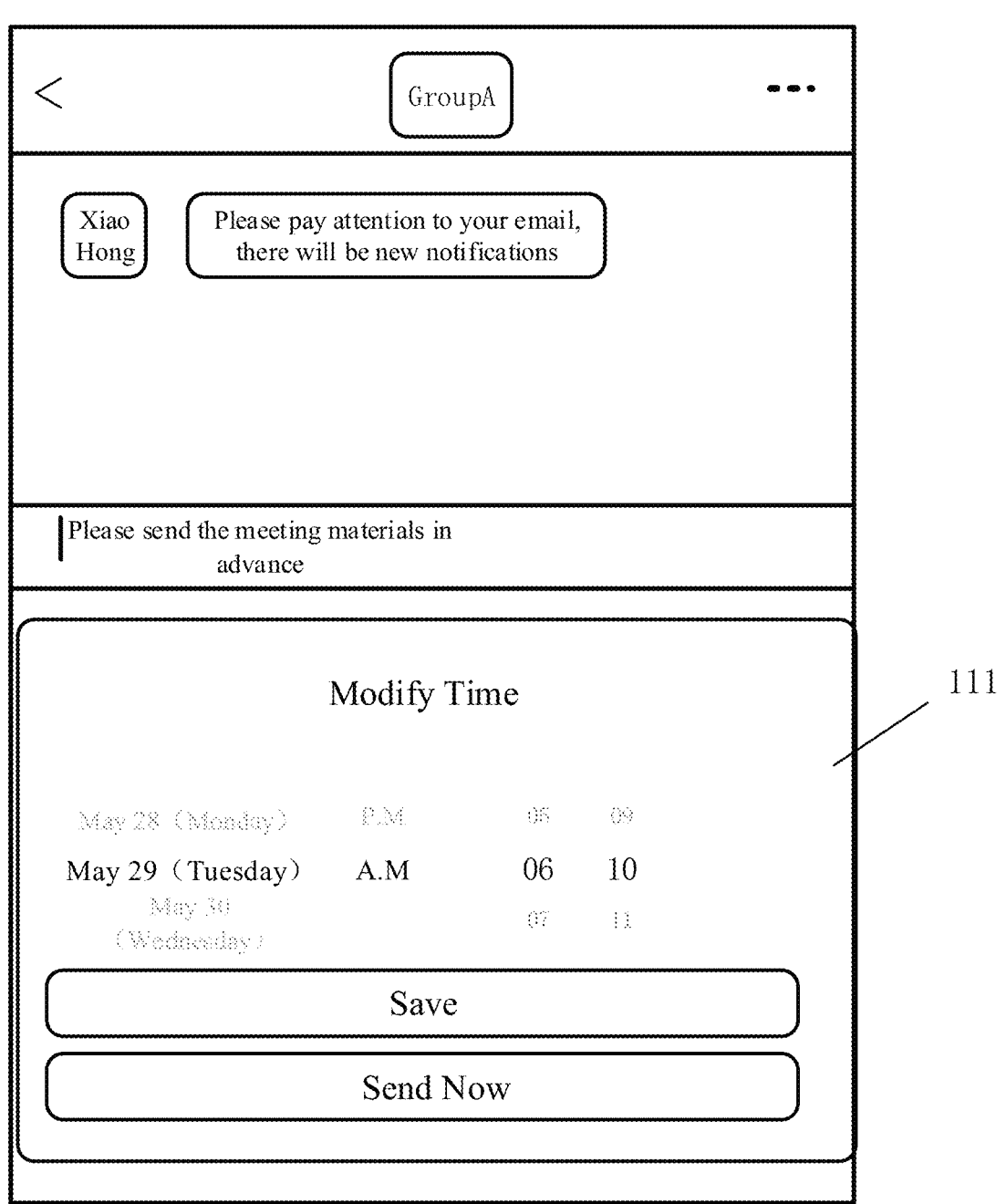
FIG. 1g2

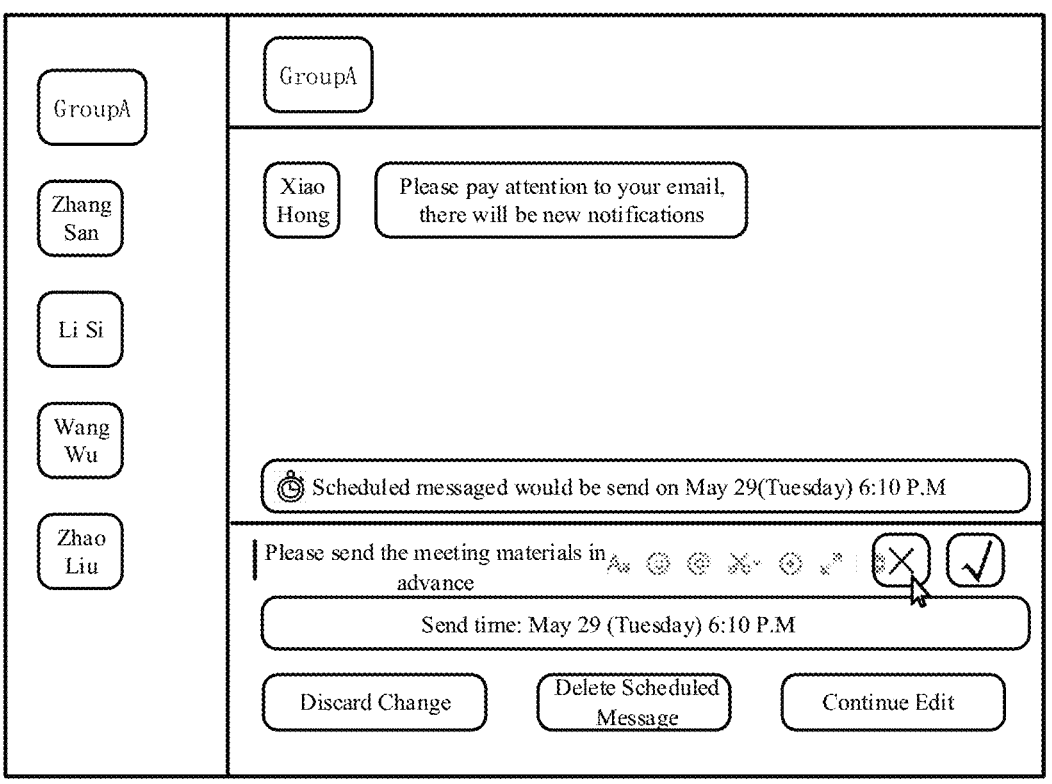
FIG. 1h1

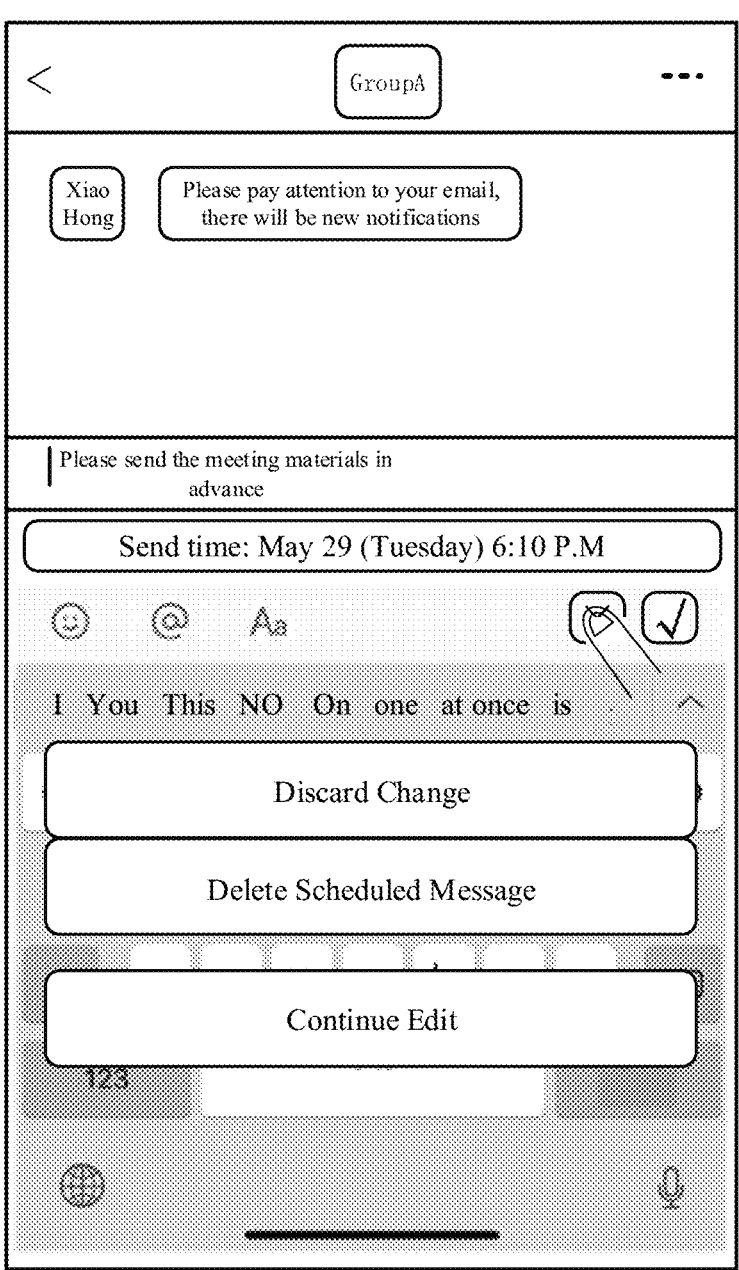
FIG. 1h2

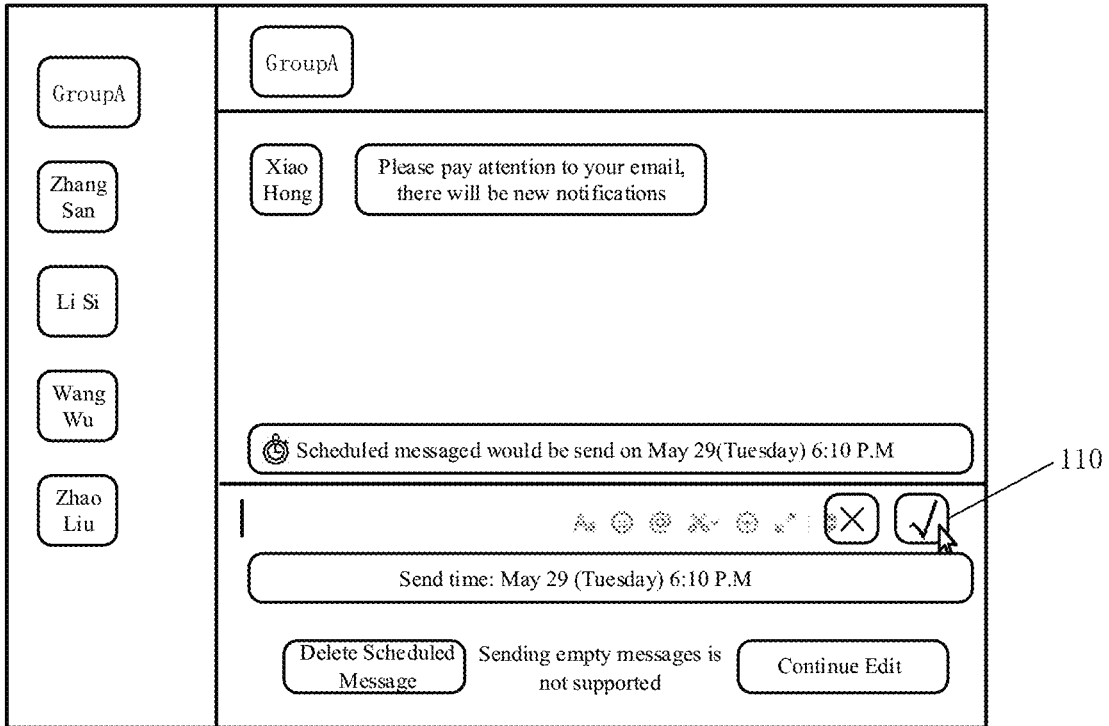
FIG. 1i1

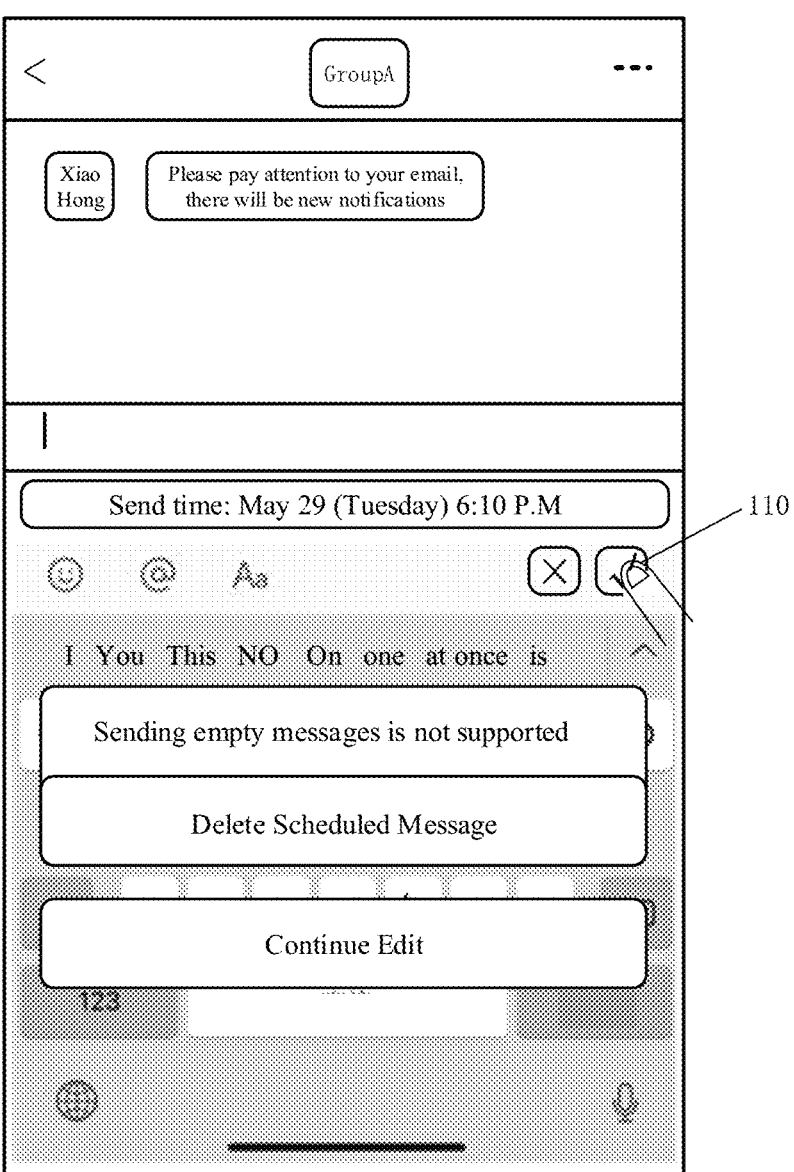
FIG. 1i2

MESSAGING PROCESSING METHOD, APPARATUS, AND ELECTRONIC DEVICE

CROSS-REFERENCE TO RELATED APPLICATION(S)

This application claims priority to Chinese Application No. 202211656132.0 filed Dec. 22, 2022, the disclosure of which is incorporated herein by reference in its entity.

FIELD

The disclosure relates to computer technologies, and more particularly relates to a method of message processing, an apparatus therefor, and an electronic device.

BACKGROUND

With advancements in computer software technologies, instant messaging tools have been increasingly utilized in people's life and work. Particularly at work, one may utilize an instant messaging tool to have a conversation with contacts or with members in a group, e.g., to discuss issues at work or send notifications. However, for a transnational team, when communicating via an instant messaging tool, it would be a challenge to manage appropriate message send time as different countries are located in different time areas and different workgroups may have different working hour arrangements, so that poor and inefficient communication likely occurs.

SUMMARY

The disclosure provides a method of message processing, an apparatus therefor, and an electronic device.

In a first aspect, there is provided a method of message processing, comprising:

presenting, responsive to a user's preset trigger operation in a target conversation, a schedule set area and a scheduled send button in the target conversation;

determining a message send time set by the user via the schedule set area; and retrieving, after the user triggers the scheduled send button, message content in a message input box of the target conversation as message content for a target scheduled message, and creating the target scheduled message according to the message send time.

In a second aspect, there is provided a method of message processing, comprising:

creating a target scheduled message in a target conversation; and presenting, in a preset area of a conversational interface of the target conversation, a re-edit entry to the target scheduled message created.

In a third aspect, there is provided an apparatus for message processing, comprising:

a presenting module configured to present, responsive to a user's preset trigger operation in a target conversation, a schedule set area and a scheduled send button in the target conversation;

a determining module configured to determine a message send time set by the user via the schedule set area; and a creating module configured to retrieve, after the user triggers the scheduled send button, message content in a message input box of the target conversation as message content for a target scheduled message, and create the target scheduled message according to the message send time.

In a fourth aspect, there is provided an apparatus for message processing, comprising:

a creating module configured to create a target scheduled message in a target conversation; and a presenting module configured to present, in a preset area of a conversational interface of the target conversation, a re-edit entry to the target scheduled message created.

In a fifth aspect, there is provided a computer-readable storage medium with a computer program stored thereon, wherein the computer program, when being executed by a computer, causes a processor to performs the method according to any of the first aspect or the second aspect.

In a sixth aspect, there is provided an electronic device, comprising: a memory, a processor, and a computer program stored on the memory and running on the processor, the program, when being executed, causes the processor to perform the method according to any of the first aspect or the second aspect.

The technical solutions provided by the embodiments of the disclosure may offer the following benefits:

According to a method of message processing and an apparatus therefor provided in the embodiments of the disclosure, responsive to a user's preset trigger operation in a target conversation of an instant messaging client, a schedule set area and a scheduled send button are presented in the target conversation, and after the user triggers the scheduled send button, message content in a message input box of the target conversation is retrieved as message content for a to-be-scheduled message, and a scheduled message is created according to a message send time set by the user via the schedule set area. Since the user may directly set the send time of the scheduled message in the target conversation and directly use the message content in the message input box of the target conversation as the message content for the to-be-scheduled message, the disclosure realizes direct creation of a scheduled message via the message input box of the instant messaging client, which facilitates converting an edited instant message to a scheduled message, extending functions of the instant messaging client, and enhancing user experience.

According to a method of message processing and an apparatus therefor provided in the embodiments of the disclosure, after the user creates a scheduled message in a target conversation, a re-edit entry to the created scheduled message is presented in a preset area of a conversational interface of the target conversation, so that the user may view or re-edit the scheduled message via the re-edit entry to the scheduled message, thereby realizing management of the scheduled message, extending functions of the instant messaging client, and enhancing of the user experience.

It is understood that, the above general description and the later detailed description are only exemplary and illustrative, not intended to limit the disclosure.

BRIEF DESCRIPTION OF THE DRAWINGS

To illustrate the technical solutions in embodiments of the disclosure or in conventional technologies more clearly, the drawings referred to in the embodiments or conventional technologies will be briefly introduced infra. It is apparent that the drawings referred to hereinafter are only some embodiments of the disclosure, and to those skilled in the art, other drawings may also be derived from these drawings without exercise of inventive efforts.

FIG. 1*a*1 is a schematic diagram of a conversational interface of an instant messaging client according to an example embodiment of the disclosure;

FIG. 1*a*2 is a schematic diagram of another conversational interface of the instant messaging client according to an example embodiment of the disclosure;

FIG. 1*b*1 is a schematic diagram of another conversational interface of the instant messaging client according to an example embodiment of the disclosure;

FIG. 1*b*2 is a schematic diagram of another conversational interface of the instant messaging client according to an example embodiment of the disclosure;

FIG. 1*c*1 is a schematic diagram of another conversational interface of the instant messaging client according to an example embodiment of the disclosure;

FIG. 1*c*2 is a schematic diagram of another conversational interface of the instant messaging client according to an example embodiment of the disclosure;

FIG. 1*d*1 is a schematic diagram of another conversational interface of the instant messaging client according to an example embodiment of the disclosure;

FIG. 1*d*2 is a schematic diagram of another conversational interface of the instant messaging client according to an example embodiment of the disclosure;

FIG. 1*e*1 is a schematic diagram of another conversational interface of the instant messaging client according to an example embodiment of the disclosure;

FIG. 1*e*2 is a schematic diagram of another conversational interface of the instant messaging client according to an example embodiment of the disclosure;

FIG. 1*f*1 is a schematic diagram of another conversational interface of the instant messaging client according to an example embodiment of the disclosure;

FIG. 1*f*2 is a schematic diagram of another conversational interface of the instant messaging client according to an example embodiment of the disclosure;

FIG. 1*g*1 is a schematic diagram of another conversational interface of the instant messaging client according to an example embodiment of the disclosure;

FIG. 1*g*2 is a schematic diagram of another conversational interface of the instant messaging client according to an example embodiment of the disclosure;

FIG. 1*h*1 is a schematic diagram of another conversational interface of the instant messaging client according to an example embodiment of the disclosure;

FIG. 1*h*2 is a schematic diagram of another conversational interface of the instant messaging client according to an example embodiment of the disclosure;

FIG. 1*i*1 is a schematic diagram of another conversational interface of the instant messaging client according to an example embodiment of the disclosure;

FIG. 1*i*2 is a schematic diagram of another conversational interface of the instant messaging client according to an example embodiment of the disclosure;

FIG. 2 is a flow diagram of a method of message processing according to an example embodiment of the disclosure;

DETAILED DESCRIPTION OF EMBODIMENTS

Figure 2:
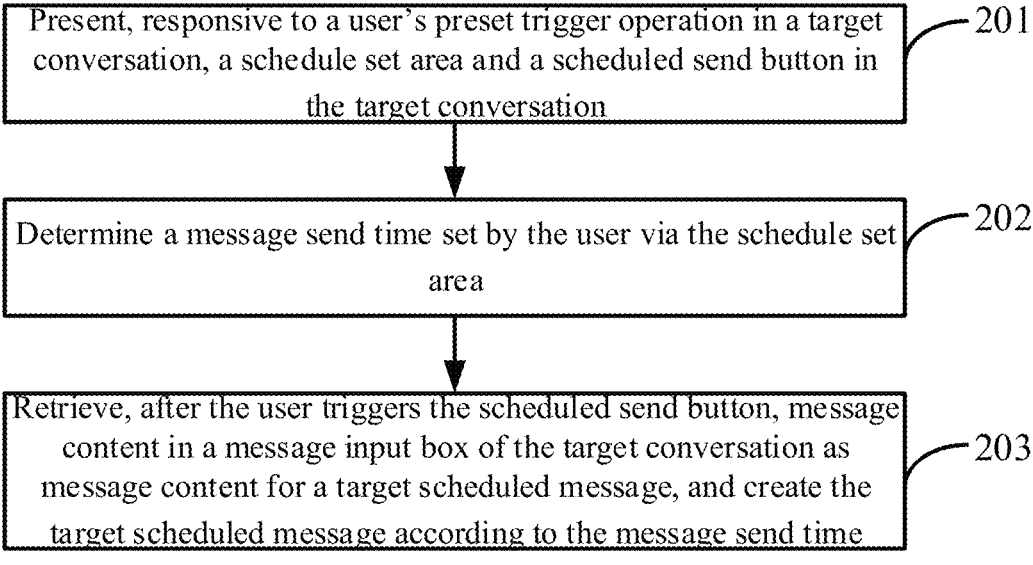

To make the technical solutions in the description more comprehensible to those skilled in the art, the technical solutions in the embodiments of the disclosure will be described clearly and comprehensively with reference to the drawings in the embodiments of the disclosure. Apparently, the embodiments described are only part of the embodiments, rather than all of them. All other embodiments derived, without exercise of inventive efforts, by those skilled in the art based on the embodiments described herein would fall within the scope sought for protection in the disclosure.

When the drawings are referred to in the description below, like reference numbers in different drawings indicate same or similar elements, unless otherwise indicated. The implementations described in the example embodiments described below do not represent all implementations consistent with the disclosure. Instead, they are only examples of the apparatuses and methods consistent with some aspects of the disclosure as limited in the appended claims.

The terms used herein are intended only for describing specific examples embodiments, not for limiting the disclosure. the terms "a/an," "said," and "the" in a singular form as used herein are also intended for including plurality, unless otherwise indicated in the context. It is also understood that, the term "and/or" used herein indicates and includes any or all possible combinations combinations of one or more associated items listed.

It is understood that, although various information may be described using terms such as first, second, and third herein, such information shall not be limited to these terms. These terms are only used to distinguish information of the same type. For example, without departing from the scope of the disclosure, first information may also be referred to as second information; likewise, the second information may also be referred to as first information. Dependent on the context, the term "if" used herein may be interpretated as "when," "upon," or "in response to determining . . . ."

With advancements in computer software technologies, instant messaging tools have been increasingly utilized in people's life and work. Particularly at work, one may utilize an instant messaging tool to have a conversation with contacts or with members in a group, e.g., to discuss issues at work or send notifications. However, for a transnational team, when communicating via an instant messaging tool, it would be a challenge to manage appropriate message send time as different countries are located in different time areas and different workgroups may have different working hour arrangements, so that poor and inefficient communication likely occurs.

According to a method of message processing provided by the disclosure, responsive to a user's preset trigger operation in a target conversation of an instant messaging client, a schedule set area and a scheduled send button are presented in the target conversation, and after the user triggers the scheduled send button, content in a message input box is retrieved as message content for a to-be-scheduled message, and a scheduled message is created according to a message send time set by the user via the schedule set area. Since the user may directly set the send time of the scheduled message in the target conversation and directly use the message content in the message input box of the target conversation as the message content for the to-be-scheduled message, the disclosure realizes direct creation of a scheduled message via the message input box of the instant messaging client, which facilitates converting an edited instant message to a scheduled message, extending functions of the instant messaging client, and enhancing user experience.

Furthermore, the disclosure further provides a method of message processing, in which after the user creates a scheduled message in a target conversation, a re-edit entry to the created scheduled message is presented in a preset area of a conversational interface of the target conversation, so that the user may view or re-edit the scheduled message via the re-edit entry to the scheduled message, thereby realizing management of the scheduled message, extending functions of the instant messaging client, and enhancing of the user experience.

FIG. 1a1 and FIG. 1a2 are schematic diagrams of a conversational interface of an instant messaging client illustrated according to an example embodiment.

As illustrated in FIG. 1a1 and FIG. 1a2, the user signing in to the instant messaging client is a member of Group A; the user may send an instant message in a conversional interface of Group A. Specifically, the user may input content of a to-be-sent message in a message input box 101 of the conversational interface, and send the instant message by clicking Send button 102. The user may also trigger Schedule Message icon 103 in a toolbar of the message input box 101 to create a scheduled message. In other embodiments of the disclosure, Schedule Message icon 103 may also be set in a "+" panel of the input box; the "+" panel is invoked by clicking "+" button in the input box; by clicking Schedule Message icon 103 in the "+" panel, the scheduled message is created, as illustrated in FIG. 1a2.

FIG. 1b1 and FIG. 1b2 illustrate a schematic diagram of a conversational interface after the Schedule Message icon is triggered. As illustrated in FIG. 1b1 and FIG. 1b2, response to the user's operation of triggering Schedule Message icon 103, the instant messaging client presents a schedule set area 104 and Scheduled Send button 105 in the conversational interface. It is noted that, the message content already inputted in the message input box does not change before and after the user triggers the Schedule Message icon, and the user may continue editing the content of the scheduled message in the message input box. The user may also set message send time by triggering the schedule set area 104.

FIG. 1c1 and FIG. 1c2 illustrate a schematic diagram of a conversational interface after the schedule set area is triggered. As illustrated in FIG. 1c1 and FIG. 1c2, responsive to the user's operation of triggering the schedule set area 104, the instant messaging client outputs a schedule set interface 106 in the conversational interface. The user may set a message send time and save it via the schedule set interface 106. FIG. 1d1 and FIG. 1d2 illustrate a schematic diagram of the conversational interface after the message send time is completely set. It is noted that, the user may trigger the schedule set area 104 again to invoke the schedule set interface 106 to modify the message send time. After finishing setting of the message send time and editing of the message content, the user may click the Scheduled Send button 105 to complete creating of the scheduled message.

FIG. 1e1 and FIG. 1e2 illustrate a schematic diagram of the conversational interface after the scheduled message is completely created. As illustrated in FIG. 1e1 and FIG. 1e2, after the scheduled message is completely created, alert information for the scheduled message may be presented in a first preset area 107 of the conversational interface. A re-edit entry to the created scheduled message may also be presented in a second preset area 108 of the conversational interface of the target conversation. The user may view and revise the scheduled message via the ren-edit entry to the scheduled message.

FIG. 1f1 and FIG. 1f2 illustrate a schematic diagram of the conversational interface after the user triggers the re-edit entry to the scheduled message. As illustrated in FIG. 1f1 and FIG. 1f2, after the user triggers the re-edit entry to the scheduled message, the instant messaging client may present a re-edit interface to the user, so that the user may perform a re-edit operation via the re-edit interface to update the send time or message content of the scheduled message. Specifically, the schedule set area 104, a first functional button 109, and a second functional button 110 may be presented in the re-edit interface, with the message content of the scheduled message being presented in the message input box 101 of the conversational interface. The user may modify the message send time of the scheduled message via the schedule set area 104, revise the message content of the scheduled message via the message input box 101, terminate re-edition by triggering the first functional button 109, and save the re-edited message by triggering the second functional button 110.

FIG. 1g1 and FIG. 1g2 illustrate a schematic diagram of the conversational interface after the user triggers the schedule set area. As illustrated in FIG. 1g1 and FIG. 1g2, after the user triggers the schedule set area 104, the instant messaging client may output a scheduled time modify interface 111 to the user, to alert the user to modify the message send time of the scheduled message via the scheduled time modify interface 111. After the user completes modification of the message send time of the scheduled message, the modified message send time may be saved by triggering Save button presented in the scheduled time modify interface 111. The user may also convert the scheduled message as an instant message and immediately send it out via a Send Now button presented in the scheduled time modify interface 111.

FIG. 1h1 and FIG. 1h2 illustrate a schematic diagram of the conversational interface after the user triggers the first functional button. As illustrated in FIG. 1h1 and FIG. 1h2, after the user triggers the first functional button 109, the instant messaging client outputs Discard Change button, Delete Scheduled Message button, and Continue Edit button to the user. The user may turn off the re-edit interface by triggering the Discard Change button, delete the scheduled message by triggering the Delete Scheduled Message button, and stay at the re-edit interface by triggering the Continue Edit button.

After the user modifies the message content of the scheduled message via the message input box 101, the modified message content may be saved by triggering the second functional button 110. It is noted that, if the user triggers the second functional button 110 after clearing the message content in the message input box 101, the user would be alerted to delete the scheduled message or continue editing the scheduled message. FIG. 1i1 and FIG. 1i2 illustrate a schematic diagram of a conversational interface after the user clears the message content in the message input box and triggers the second functional button. As illustrated in FIG. 1i1 and FIG. 1i2, after the user clears the message content in the message input box and triggers the second functional button 110, the instant messaging client outputs Delete Scheduled Message button and Continue Edit button to the user. The user may trigger the Delete Scheduled Message button to delete the scheduled message and stay at the re-edit interface by triggering the Continue Edit button.

According to the solution provided in the embodiments of the disclosure, responsive to a user's preset trigger operation in a target conversation of an instant messaging client, a schedule set area and a Scheduled Send button are presented in the target conversation, and after the user triggers the Scheduled Send button, message content in a message input box of the target conversation is retrieved as message content for a to-be-scheduled message, and a scheduled message is created according to a message send time set by the user via the schedule set area. Since the user may directly set the send time of the scheduled message in the target conversation and directly use the message content in the message input box of the target conversation as the message content for the to-be-scheduled message, the disclosure realizes direct creation of a scheduled message via the message input box of the instant messaging client, which facilitates converting an edited instant message to a scheduled message, extending functions of the instant messaging client, and enhancing user experience.

Furthermore, after the user creates a scheduled message in a target conversation, a re-edit entry to the created scheduled message is presented in a preset area of a conversational interface of the target conversation, so that the user may view or re-edit the scheduled message via the re-edit entry to the scheduled message, thereby realizing management of the scheduled message, extending functions of the instant messaging client, and enhancing of the user experience.

Even furthermore, after the user triggers the schedule set area, the user is alerted to modify the message send time of the scheduled message, or to convert the scheduled message to an instant message to be sent immediately, which facilitates converting the scheduled message to an instant message, thereby facilitating user operation, further extending functions of the instant messaging client, and enhancing user experience.

Still furthermore, after the user clears the message content in the message input box, responsive to the user's triggering a second functional button, the user is alerted to delete the scheduled message or continue editing the scheduled message, which avoids the user from sending the cleared message as the scheduled message due to an unintentional operation, further enhancing user experience.

Hereinafter, the disclosure will be described in more detail in conjunction with specific example embodiments.

FIG. 2 is is a flow diagram of a method of message processing according to an example embodiment of the disclosure. The method may be applied to a terminal device. In this example embodiment, at the ease of understanding, the terminal device refers to a terminal device supporting a third-party instant messaging client. Those skilled in the art would appreciate that, the terminal device may include, but is not limited to, a mobile terminal device such as a smart phone, a smart wearable device, and a tablet computer. The method may comprise the following steps:

As illustrated in FIG. 2, in step 201, responsive to a user's preset trigger operation in a target conversation, a schedule set area and a Scheduled Send button are presented.

In this example embodiment, the target conversation may refer to a conversation between the user and a friend/group member in the instant messaging client; the user may send a message to the friend/group member in the target conversation; and the message sent may include an instant message and a scheduled message. Specifically, to send an instant message, the user may input message content via a message input box of the target conversation, and clicking a Send Instant Message button to immediately send the message content out as an instant message. To send a scheduled message, the user may perform a preset trigger operation in the target conversation, so that the instant messaging client presents a schedule set area and the Scheduled Send button in the conversational interface of the target conversation (as exemplarily illustrated in FIG. 1*b*1 and FIG. 1*b*2). The user may create a scheduled message via the schedule set area and the Scheduled Send button.

In this implementation, the preset trigger operation may refer to the user's operation of triggering a designated icon (the designated icon may be displayed or hidden in a toolbar of the message input box of the target conversation), or the user's operation of sliding in a designated area following a preset trajectory. It would be appreciated that, the preset trigger operation may be any reasonable operation, and this example embodiment has no limitation on a specific manner of the preset trigger operation.

In step 202, a message send time set by the user via the schedule set area is determined; and in step 203, after the user's triggering the Scheduled Send button, message content in a message input box of the target conversation is retrieved as message content for a target scheduled message, and the target scheduled message is created according to the message send time.

In this example embodiment, after the user triggers the schedule set area, a schedule set interface (as exemplarily illustrated in FIG. 1*c*1 and FIG. 1*c*2) may be outputted, so that the user may set a message send time via the schedule set interface, and the instant messaging client may retrieve the time set by the user via the schedule set interface as the send time of the scheduled message.

Additionally, the user may directly edit the message content of the scheduled message in the message input box of the target session. It is noted that, the message content already inputted in the message input box does not change before and after the user triggers the designated icon, so that the user may continue editing the content of the scheduled message in the message input box.

After the user completes setting of the message send time and editing of the content of the scheduled message, the user may trigger the Scheduled Send button; the instant messaging client may retrieve the message content in the message input box of the target conversation as the message content for a target scheduled message and create the target scheduled message according to the message send time.

Specifically, the instant messaging client may send create information corresponding to the target scheduled message to a server, which create information may include the message content of the target scheduled message, the message send time, and identification information of the target conversation. Upon receipt of the create information, the server may store the create information and start countdown. When the message send time arrives, the server may send the message content of the target scheduled message to the target conversation based on the identification information of the target conversation included in the create information.

Optionally, after the target scheduled message is created, alert information for the target scheduled message may be further presented in a first preset area of the conversational interface of the target conversation, and a re-edit entry to the target scheduled message is presented in a second preset area of the conversational interface of the target conversation (as exemplarily illustrated in FIG. 1e1 and FIG. 1e2). This facilitates the user to quickly locate, view, and re-edit the target scheduled message.

According to the method of message processing provided in the embodiments of the disclosure, responsive to a user's preset trigger operation in a target conversation of an instant messaging client, a schedule set area and a Scheduled Send button are presented in the target conversation, and after the user triggers the Scheduled Send button, message content in a message input box of the target conversation is retrieved as message content for a to-be-scheduled message, and a scheduled message is created according to a message send time set by the user via the schedule set area. Since the user may directly set the send time of the scheduled message in the target conversation and directly use the message content in the message input box of the target conversation as the message content for the to-be-scheduled message, the disclosure realizes direct creation of a scheduled message via the message input box of the instant messaging client, which facilitates converting an edited instant message to a scheduled message, extending functions of the instant messaging client, and enhancing user experience.

Figure 3:
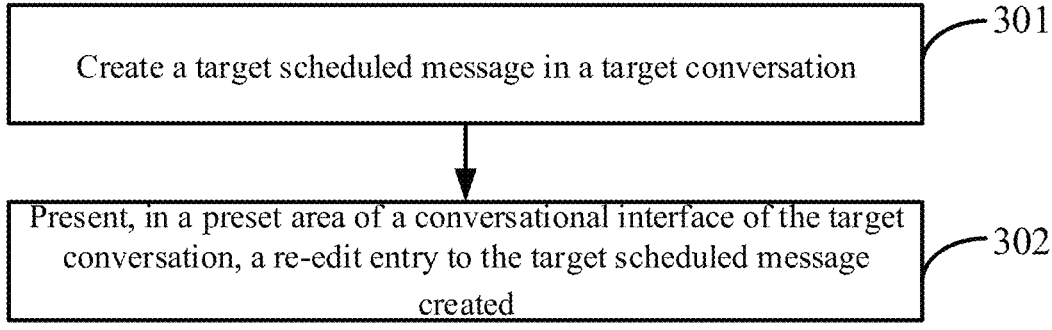
FIG. 3 is a flow diagram of another method of message processing according to an example embodiment of the disclosure.

FIG. 3 is is a flow diagram of another method of message processing according to an example embodiment of the disclosure. This example embodiment describes a process after a target scheduled message is created in a target conversation. This method may be applied to a terminal device. In this example embodiment, a terminal device supporting a third-party instant messaging client is exemplarily illustrated. Those skilled in the art would appreciate that, the terminal device may include, but is not limited to, a mobile terminal device such as a smart phone, a smart wearable device, a tablet computer, etc. The method may comprise the following steps:

As illustrated in FIG. 3, in step 301, a target scheduled message is created in a target conversation, and in step 302, a re-edit entry to the created target scheduled message is presented in a preset area of a conversational interface of the target conversation.

In this example embodiment, a user may create a target scheduled message in the target conversation in a manner as described in the example embodiment of FIG. 2; after the target scheduled message is completely created, a re-edit entry to the created target scheduled message may be presented in a preset area of the conversational interface of the target conversation. After the user triggers the re-edit entry, the instant messaging client may present a re-edit interface to the user. The user may perform an edit operation via the re-edit interface so as to update the target scheduled message.

Specifically, the instant messaging client may present a schedule set area, a first functional button, and a second functional button to the user and present message content of the target scheduled message in the message input box of the target conversation. In this implementation, the first functional button is configured to terminate re-edition (as exemplarily illustrated in FIG. 1h1 and FIG. 1h2), and the second functional button is configured to save the re-edited message (as exemplarily illustrated in FIG. i1 and FIG. 1i2).

To modify the message send time, the user may trigger the schedule set area, so that the instant messaging client may alert the user to modify the message send time of the target scheduled message, or convert the target scheduled message to an instant message and send it immediately (as exemplarily illustrated in FIG. 1g1 and FIG. 1g2). To modify the message content, the user may directly edit the message content of the target scheduled message in the message input box. After the user has cleared the message content in the message input box, the instant messaging client may alert, responsive to triggering the second functional button, the user to delete the target scheduled message or continue editing the target scheduled message (as exemplarily illustrated in FIG. 1i1 and FIG. 1i2).

After completing modification to the target scheduled message, the user may trigger the second functional button so as to update the message content of the target scheduled message according to the updated message content in the message input box. In one implementation, the instant messaging client may send updated information corresponding to the target scheduled message to the server, which updated information may include updated message content of the target scheduled message, the message send time, and identification information of the target conversation. After receipt of the updated information, the server may update, according to the updated information, the create information corresponding to the target scheduled message as previously stored. When the updated message send time arrives, the server sends the updated message content of the target scheduled message to the target conversation.

According to a method of message processing provided by the disclosure, after the user creates a scheduled message in a target conversation, a re-edit entry to the created scheduled message is presented in a preset area of a conversational interface of the target conversation, so that the user may view or re-edit the scheduled message via the re-edit entry to the scheduled message, thereby realizing management of the scheduled message, extending functions of the instant messaging client, and enhancing of the user experience.

It is noted that, although operations of the methods according to embodiments of the disclosure have described in a specific sequence in the example embodiments above, it does not require or imply that the methods are compulsorily performed according to the specific sequence, or a desired outcome can only be achieved after all of the illustrated operations have been completely performed. On the contrary, execution sequences of the steps depicted in the flow diagrams may be changed. Additionally or alternatively, some steps may be omitted; a plurality of steps may be merged into one step to execute, and/or one step may be broken down into a plurality of steps to execute.

Corresponding to the embodiments of the message processing methods described supra, the disclosure further provides example embodiments of a message processing apparatus.

Figure 4:
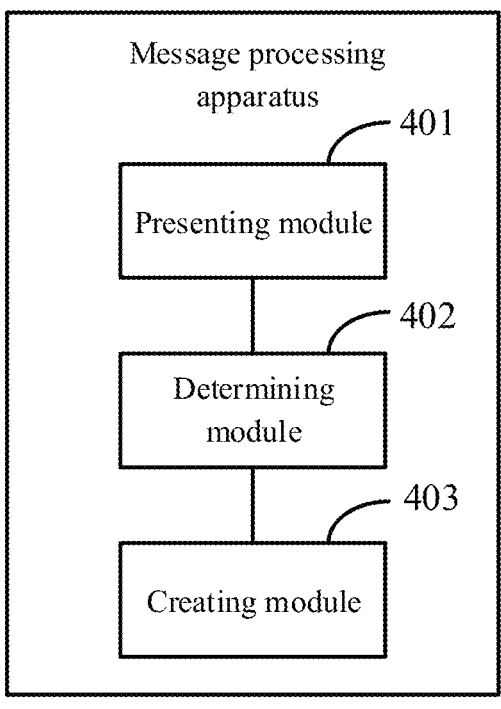
FIG. 4 is a block diagram of an apparatus for message processing according to an example embodiment of the disclosure.

As illustrated in FIG. 4, which is a block diagram of an apparatus for message processing according to an example embodiment of the disclosure, the apparatus may comprise a presenting module 401, a determining module 402, and a creating module 403;

wherein the presenting module 401 is configured to present, responsive to a user's preset trigger operation in a target conversation, a schedule set area and a scheduled send button in the target conversation;

the determining module 402 is configured to determine a message send time set by the user via the schedule set area; and the creating module 403 is configured to retrieve, after the user triggers the scheduled send button, message content in a message input box of the target conversation as message content for a target scheduled message, and create the target scheduled message according to the message send time.

In some embodiments, the determining module 402 may comprise: an output sub-module and a retrieval sub-module (not shown), wherein the output sub-module is configured to output, after the user triggers the schedule set area, a schedule set interface; and the retrieval sub-module is configured to retrieve the message send time set by the user via the schedule set interface.

In some other embodiments, the creating module 403 is configured to: transmit create information corresponding to the target scheduled message to a server, the create information comprising: the message content of the target scheduled message, the message send time, and identification information of the target conversion, so that the server stores the create information and transmits the message content to the target conversation at the message send time.

In some other embodiments, the apparatus may further comprise an alerting module and/or an entry module (not shown), wherein the alerting module is configured to present, in a first preset area of a conversational interface of the target conversation, alert information for the target scheduled message; and the entry module is configured to present, in a second preset area of the conversational interface of the target conversation, a re-edit entry to the target scheduled message.

Figure 5:
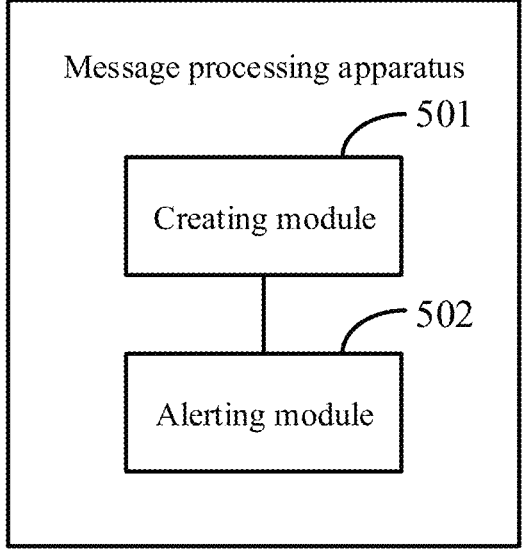
FIG. 5 is a block diagram of another apparatus for message processing according to an example embodiment of the disclosure.

As illustrated in FIG. 5, which is a block diagram of another apparatus for message processing according to an example embodiment of the disclosure, the apparatus may comprise: a creating module 501 and an alerting module 502, wherein the creating module 501 is configured to create a target scheduled message in a target conversation; and the alerting module 502 is configured to present, in a preset area of a conversational interface of the target conversation, a re-edit entry to the target scheduled message created.

In some other embodiments, the apparatus may further comprise: an output module (not shown), wherein the output module is configured to provide, responsive to a user's operation on the re-edit entry, a re-edit interface to the user, so that the user updates the target scheduled message via the re-edit interface.

In some other embodiments, the output module is configured to: present a schedule set area to the user, present a first functional button and a second functional button, and present, in a message input box of the target conversation, message content of the target scheduled message, wherein the first functional button is configured to terminate re-edition; and the second functional button is configured to save a re-edited message.

In some other embodiments, the output module is configured to: present a schedule set area to the user.

In one implementation, the apparatus may further comprise: a first alerting module (not shown).

The first alerting module is configured to alert, response to the user's triggering the schedule set area, the user to: modify a message send time of the target scheduled message, or change the target scheduled message to an instant message and send the instant message immediately.

In some other embodiments, the apparatus may further comprise: a second alerting module (not shown), wherein the second alert module is configured to: alert, responsive to the user's triggering the first functional button, the user to: delete the target scheduled message, or turn off the re-edit interface, or continue editing the target scheduled message.

In some other embodiments, the apparatus may further comprise: an updating module (not shown), wherein the updating module is configured to: update, after the user updates the message content in the message input box, responsive to the user's triggering the second functional button, the message content of the target scheduled message according to the updated message content in the message input box.

In some other embodiments, the apparatus may further comprise: a third alerting module (not shown), wherein the third alerting module is configured to alert, after the user clears the message content in the message input box, responsive to the user's triggering the second functional button, the user to: delete the target scheduled message, or continue editing the target scheduled message.

Since the apparatus embodiments substantially correspond to method embodiments, relevant features of the apparatus embodiments may refer to the depictions of method embodiments. The apparatus embodiments described supra are only schematic, and those modules illustrated as discrete modules may be or may not be separate. The components illustrated as units may be or may not be physical units, i.e., they may be located at a same place or may be distributed on a plurality of network units. Some or all of the modules may be selected to implement the solutions of the embodiments of the disclosure dependent on actual needs. A person of normal skill in the art may understand and implement the apparatus embodiments without exercise of inventive work.

Figure 6:
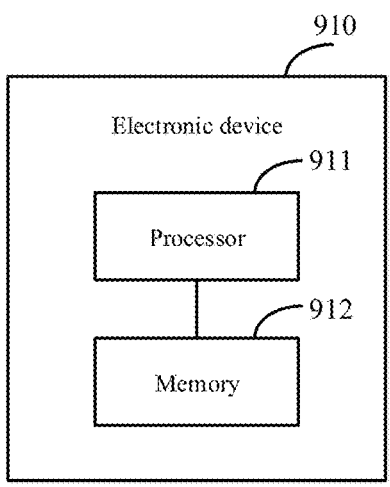
FIG. 6 is schematic block diagram of an electronic device according to some embodiments of the disclosure.

FIG. 6 illustrates a structural schematic diagram of an electronic device according to some embodiments of the disclosure. As illustrated in FIG. 6, the electronic device 910 comprises a processor 911 and a memory 912, which may be implemented at a client or a server. The memory 912 is configured to non-transiently store a computer-executable instruction (e.g., one or more computer-program modules). The processor 911 is configured to run the computer-executable instruction, which, when being run by the processor 911, may perform one or more steps of the methods of messaging processing as described supra and further implement the methods of message processing described supra. The memory 912 and the processor 911 may be interconnected via a bus system and/or other form of connection mechanism (not shown).

For example, the processor 911 may refer to a central processing unit (CPU), a graphical processing unit (GPU), or other form of processing unit having a data processing capability and/or program executing capability. For example, the central processing unit (CPU) may be X86 or ARM architecture, etc. The processor 911 may be a general-purpose processor or a dedicated processor, which may control other components in the electronic device 910 to perform desired functions.

For example, the memory 912 may comprise any combination of one or more computer program products; the computer program products may include various forms of computer-readable storage mediums, e.g., volatile memories and non-volatile memories. Examples of the volatile memories may include a random-access memory (RAM) and/or a cache, etc. Examples of the non-volatile memories may include read-only memory (ROM), hard disk, erasable programmable read-only memory (EPROM), portable compact-disc read-only storage medium (CD-ROM), USB memory, and flash memory, etc. One or more computer program modules may be stored on the computer-readable storage medium, and the processor 911 may run the one or more computer program modules to perform various functions of the electronic device 910. The computer-readable storage medium may also store various kinds of applications and various data, as well as various data used and/or generated by the applications.

It is noted that, in the embodiments of the disclosure, the specific functions and technical effects of the electronic device 910 may refer to the depictions of the method of message processing noted supra, which are not repeated here.

Figure 7:
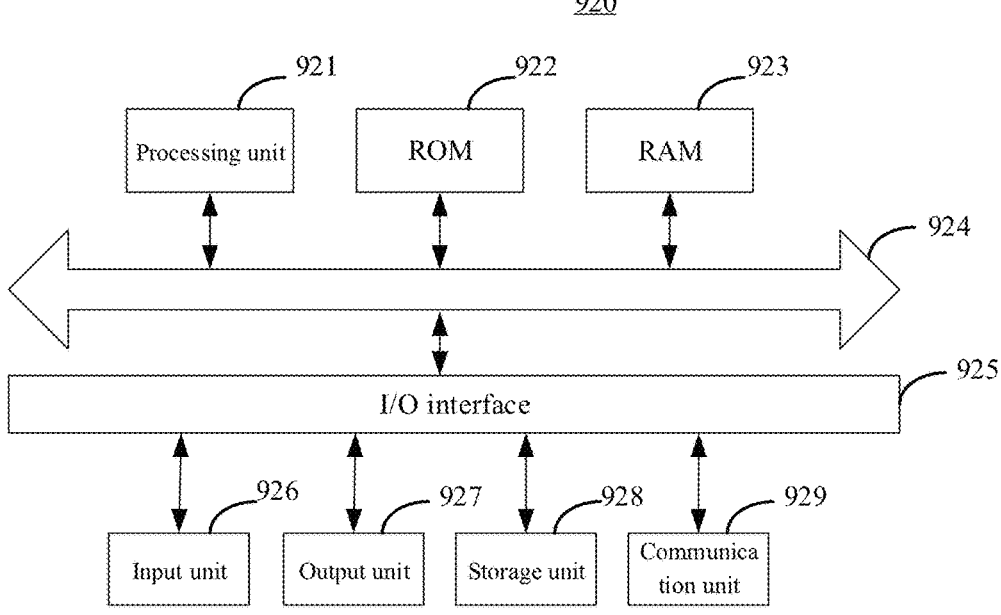
FIG. 7 is a schematic block diagram of another electronic device according to some embodiments of the disclosure.

FIG. 7 is a schematic block diagram of another electronic device according to some embodiments of the disclosure. The electronic device 920 is applicable to for example perform the methods of message processing provided in the embodiments of the disclosure. The electronic device 920 may be a terminal device, etc., which may be implemented as a client or a server. The electronic device 920 may include, but is not limited to, a mobile phone, a laptop computer, a digital broadcast receiver, a PDA (Personal Digital Assistant), a PAD (Tablet), a PMP (Portable Media Player), or a vehicle-mounted terminal (e.g., a vehicle-mounted navigation terminal), or a wearable electronic device, and a fixed terminal such as a digital TV, a desktop computer, or a smart home device, etc. It is noted that, the electronic device 920 is only an example, which does not constitute any limitation to the functions and scope of use of the embodiments of the disclosure.

As illustrated in FIG. 7, the electronic device 920 may comprise a processing unit (e.g., a Center Processing Unit, a Graphic Processing Unit, etc.) 921, which may execute various suitable actions and processing based on the program stored in a read-only memory (ROM) 922 or a program loaded in the random-access memory (RAM) 923 from a storage unit 928. The RAM 923 can also store various kinds of programs and data necessary to operation of the electronic device 920. The processing device 921, ROM 922 and RAM 923 are interconnected to each other via a bus 924. The input/output (I/O) interface 925 is also connected to the bus 924.

Generally, the following devices may be connected to the I/O interface 925: an input unit 926 including, e.g., a touch screen, a touch pad, a keypad, a mouse, a camera, a microphone, an accelerometer, or a gyroscope; an output unit 927, e.g., an LCD (Liquid Crystal Display), a loud-speaker, or a vibrator; a storage unit 928 such as a magnetic tape, a hard disk; and a communication unit 929. The communication unit 929 allows the electronic device 920 to exchange information/data with other devices via wireless or cable communication. Although the electronic device 920 comprising various components is shown in FIG. 7, it is understood that it is not required to implement or possess all of the illustrated components. Alternatively, more or less components may be implemented or possessed.

For example, according to embodiments of the disclosure, the method of message processing may be implemented as computer software programs. For example, embodiments of the disclosure comprise a computer program product comprising a computer program carried on the non-transient computer-readable medium, the computer program including program codes for performing the methods of message processing illustrated in the flow diagrams. In such embodiments, the computer program may be downloaded and installed from the network via the communication unit 929, or installed from the storage unit 508, or installed from the ROM 922. When the computer program is executed by the processing unit 921, the actions defined in the methods of message processing according to the embodiments of the disclosure are implemented.

Figure 8:
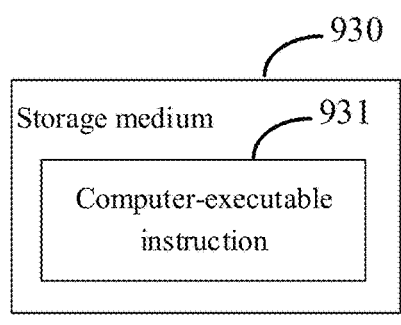
FIG. 8 is a schematic diagram of a storage medium according to some embodiments of the disclosure.

FIG. 8 is a schematic diagram of a storage medium according to some embodiments of the disclosure. For example, as illustrated in FIG. 8, the storage medium 930 may be a non-transient computer-readable storage medium configured to store non-transient computer-executable instructions 931. The non-transient computer-executable instructions 931, when being executed by the processor, may implement the methods of message processing according to the embodiments of the disclosure, e.g., the non-transient computer-executable instructions 931, when being executed by the processor, may perform one or more steps of the methods of message processing as described supra.

For example, the storage medium 930 may be applied in the electronic device. For example, the storage medium 930 may comprise a memory in the electronic device.

For example, the storage medium may comprise a memory card of a smart phone, a storage part of a tablet computer, a hard disk of a personal computer, a random access memory (RAM), a read-only memory (ROM), an erasable programmable read-only memory (EPROM), a portable compact-disc read-only storage medium (CD-ROM), a flash memory, or any appropriate combination thereof, which may also be other appropriate storage medium.

For example, the depictions regarding the storage medium 930 may refer to the depictions of the memory in the electronic device embodiment, which will not be repeated here. The specific functions and technical effects of the storage medium 930 may refer to the depictions of the methods of message processing provided supra, which will not be repeated here.

It is noted that, within the context of the present disclosure, the computer-readable medium may be any tangible medium including or storing programs for or related to the instruction execution system, apparatus, or device. The computer-readable medium may be a computer-readable signal medium or a computer-readable storage medium, or any combination of the two. The computer-readable medium may include, but is not limited to, electronic, magnetic, optical, electro-magnetic, infrared or semiconductor system, apparatus or device, or any combination thereof. More specific examples of the computer-readable storage medium include an electric connection via one or more wires, a portable computer magnetic disk, a hard disk, a random access memory (RAM), a read-only memory (ROM), an erasable programmable read-only memory (EPROM or flash memory), an optical storage device, a magnetic storage device, or any appropriate combination thereof. However, in the disclosure, the computer-readable signal medium may include data signals in the base band or propagated as a part of carrier, in which the computer-readable program codes are carried. This propagated data signals may take on various forms, including, but not limited to, electromagnetic signals, optical signals, or any suitable combination thereof. The computer-readable signal medium may also be any computer-readable medium other than the computer-readable storage medium, which computer-readable signal medium may transmit, propagate, or transfer a program used by the instruction executing system, apparatus or device, or used in combination therewith. The program code stored on the computer-readable medium may be transmitted via any appropriate medium including, but is not limited to, wires, cables, RFs (Radio Frequencies), etc., or any appropriate combination thereof.

Those skilled in the art, after considering the specification and practicing the disclosure, would readily contemplate other embodiments. The disclosure intends to cover any alteration, use, or adaptive change of the disclosure, and these alterations, uses or adaptive changes follow a general principle of the disclosure and includes common knowledge or customary technical means, not referred to in the disclosure, in the technical field. The specification and the embodiments are deemed as exemplary, and the true scope and spirit of the disclosure are defined in the appended claims.

It is understood that, the disclosure is not limited to the exact structures described supra and illustrated in the drawings and may be subjected to various modifications and changes without departing from its scope. The scope of the disclosure is limited only by the appended claims.

We claim:

1. A method of message processing, comprising:
    displaying, responsive to a user's preset trigger operation in a target conversation, a schedule set area and a scheduled send button;
    obtaining a message send time set by the user via the schedule set area; and
    obtaining, after the user triggers the scheduled send button, message content in a message input box of the target conversation as message content for a target scheduled message, and creating the target scheduled message according to the message send time;
    the method further comprises:
        in response to the user updating the message content for a target scheduled message, sending updated information corresponding to the target scheduled message to the server, wherein the updated information comprises at least one of updated message content of the target scheduled message, the message send time, and identification information of the target conversation;
    the method further comprises:
        in response to the message content already inputted in the message input box being cleared, providing a delete choice of the target scheduled message for the user; and
        in response to the delete choice of the target scheduled message being trigged by the user, deleting the target scheduled message.

2. The method of claim 1, wherein obtaining the message send time set by the user via the schedule set area comprises:
    outputting, after the user triggers the schedule set area, a schedule set interface; and
    obtaining the message send time set by the user via the schedule set interface.

3. The method of claim 1, wherein the creating the target scheduled message according to the message send time comprises:
    transmitting create information corresponding to the target scheduled message to a server;
    the create information comprising: the message content of the target scheduled message, the message send time, and identification information of the target conversation, so that the server stores the create information and transmits the message content to the target conversation at the message send time.

4. The method of claim 1, wherein after creating the target scheduled message, the method further comprises:

displaying, in a first preset area of a conversational interface of the target conversation, alert information for the target scheduled message; and displaying, in a second preset area of the conversational interface of the target conversation, a re-edit entry to the target scheduled message.

5. A method of message processing, comprising:

creating a target scheduled message in a target conversation; and displaying, in a preset area of a conversational interface of the target conversation, a re-edit entry to the target scheduled message created;

the method further comprises:
    in response to the user updating the message content for a target scheduled message, sending updated information corresponding to the target scheduled message to the server, wherein the updated information comprises updated message content of the target scheduled message, the message send time, and identification information of the target conversation;

the method further comprises:
    in response to the message content already inputted in a message input box being cleared, providing a delete choice of the target scheduled message for the user; and in response to the delete choice of the target scheduled message being trigged by the user, deleting the target scheduled message.

6. The method of claim 5, further comprising:

providing, responsive to a user's operation on the re-edit entry, a re-edit interface to the user, so that the user updates the target scheduled message via the re-edit interface.

7. The method of claim 6, wherein the providing a re-edit interface to the user comprises:
    displaying a schedule set area to the user, displaying a first functional button and a second functional button, and displaying, in a message input box of the target conversation, message content of the target scheduled message, wherein the first functional button is configured to terminate re-edition; and the second functional button is configured to save a re-edited message.

8. The method of claim 6, wherein:

the providing a re-edit interface to the user comprises: displaying a schedule set area to the user; and the method further comprises: alerting, response to the user's triggering the schedule set area, the user to: modify a message send time of the target scheduled message, or change the target scheduled message to an instant message and send the instant message immediately.

9. The method of claim 7, further comprising:

alerting, responsive to the user's triggering the first functional button, the user to: delete the target scheduled message, or turn off the re-edit interface, or continue editing the target scheduled message.

10. The method of claim 7, further comprising:

updating, after the user updates the message content in the message input box, responsive to the user's triggering the second functional button, the message content of the target scheduled message according to the updated message content in the message input box.

11. The method of claim 7, further comprising:

alerting, after the user clears the message content in the message input box, responsive to the user's triggering the second functional button, the user to: deleting the target scheduled message, or continue editing the target scheduled message.

12. An electronic device, comprising a memory and a processor, executable codes being stored in the memory, the executable codes, when being executed by the processor, cause the processor to:

display, responsive to a user's preset trigger operation in a target conversation, a schedule set area and a scheduled send button;

obtain a message send time set by the user via the schedule set area; and obtain, after the user triggers the scheduled send button, message content in a message input box of the target conversation as message content for a target scheduled message, and create the target scheduled message according to the message send time, the device is further caused to, in response to the user updating the message content for a target scheduled message, send updated information corresponding to the target scheduled message to the server, wherein the updated information comprises updated message content of the target scheduled message, the message send time, and identification information of the target conversation, the device is further caused to, in response to the message content already inputted in the message input box being cleared, provide a delete choice of the target scheduled message for the user, and in response to the delete choice of the target scheduled message being trigged by the user, delete the target scheduled message.

13. The electronic device of claim 12, wherein the processor being caused to obtain a message send time set by the user via the schedule set area includes being caused to:

output, after the user triggers the schedule set area, a schedule set interface; and obtain the message send time set by the user via the schedule set interface.

14. The electronic device of claim 12, wherein the processor being caused to create the target scheduled message according to the message send time includes being caused to:

transmit create information corresponding to the target scheduled message to a server;

the create information comprising: the message content of the target scheduled message, the message send time, and identification information of the target conversation, so that the server stores the create information and transmits the message content to the target conversation at the message send time.

15. The electronic device of claim 12, wherein after the processor being caused to create the target scheduled message, the processor is further caused to:

display, in a first preset area of a conversational interface of the target conversation, alert information for the target scheduled message; and display, in a second preset area of the conversational interface of the target conversation, a re-edit entry to the target scheduled message.

\* \* \* \* \*